Jan. 19, 1960  V. A. BROWNING  2,921,503
AUTOMATIC FIREARM
Filed Aug. 31, 1953  5 Sheets-Sheet 1
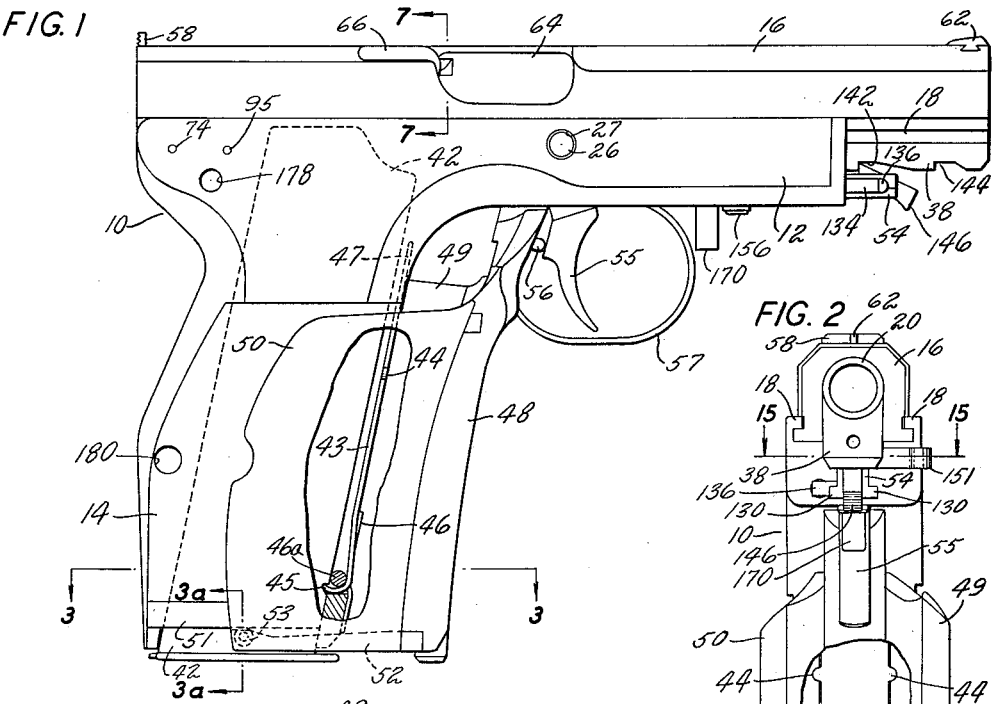
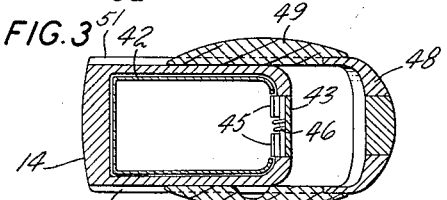
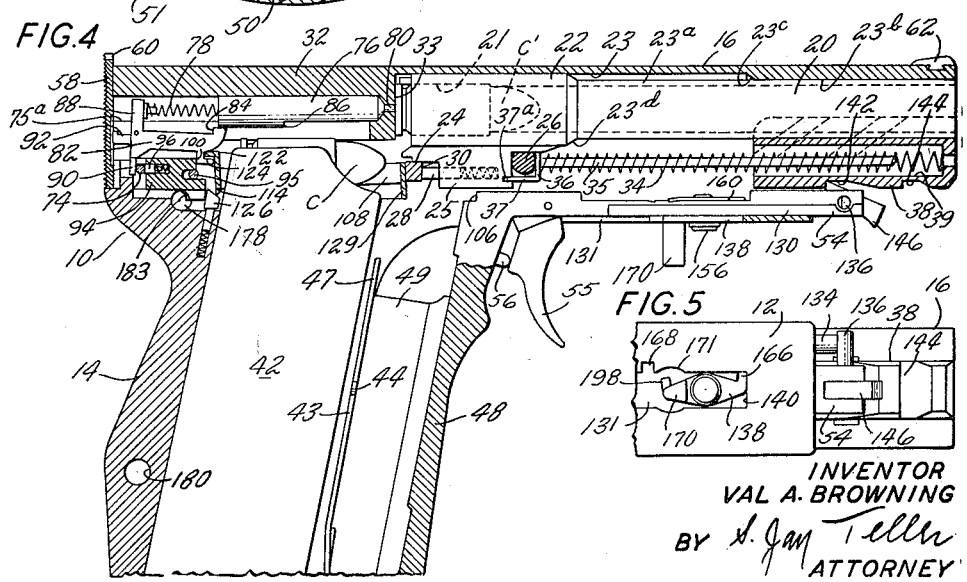
INVENTOR
VAL A. BROWNING
BY *S. Jay Teller*
ATTORNEY Jan. 19, 1960  V. A. BROWNING  2,921,503
AUTOMATIC FIREARM
Filed Aug. 31, 1953  5 Sheets-Sheet 2
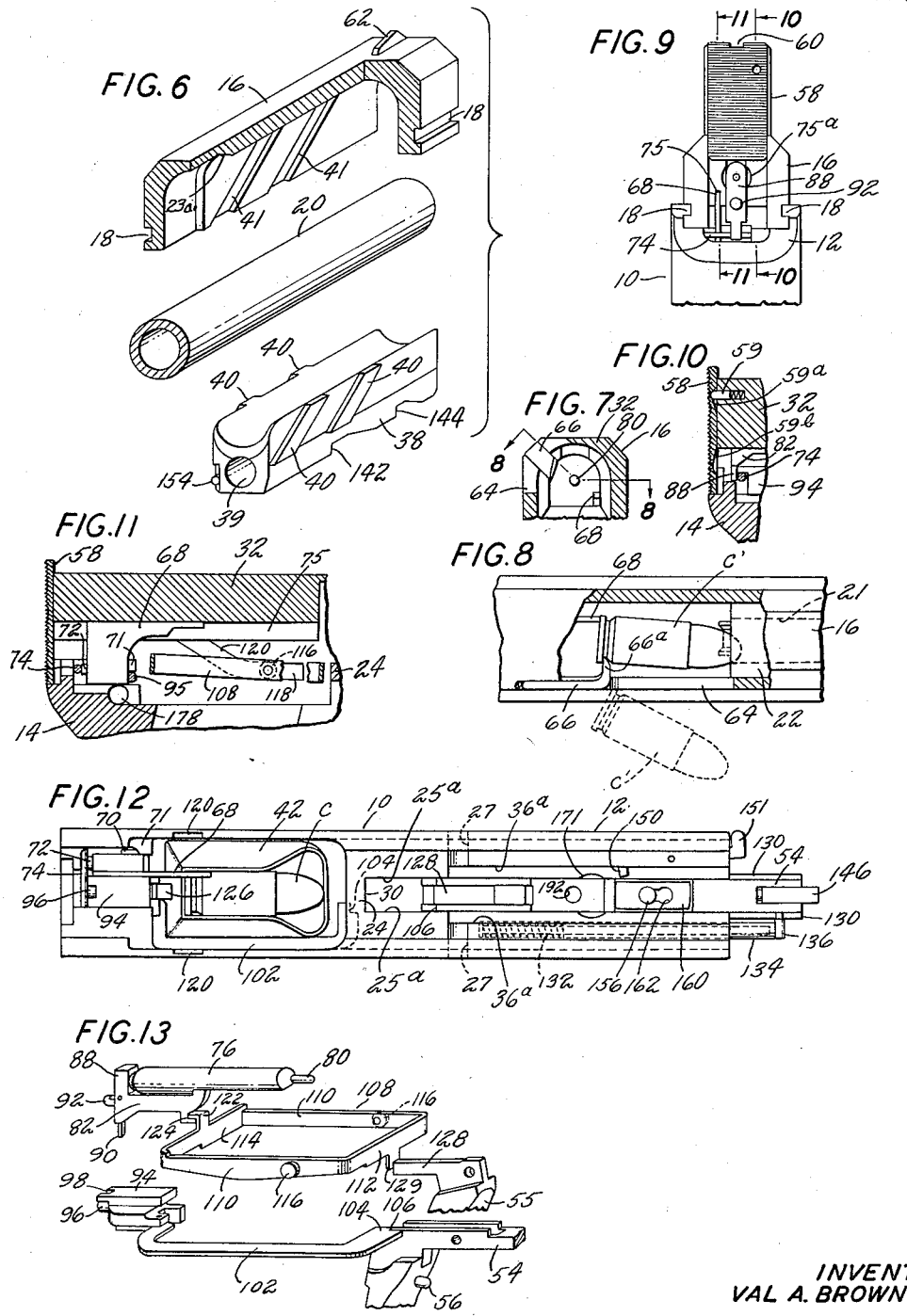
INVENTOR
VAL A. BROWNING
BY S. Jay Teller
ATTORNEY Jan. 19, 1960 V. A. BROWNING 2,921,503
AUTOMATIC FIREARM
Filed Aug. 31, 1953 5 Sheets-Sheet 3

INVENTOR
VAL A. BROWNING
BY S. Jay Teller
ATTORNEY

Jan. 19, 1960  V. A. BROWNING  2,921,503
AUTOMATIC FIREARM
Filed Aug. 31, 1953  5 Sheets-Sheet 4
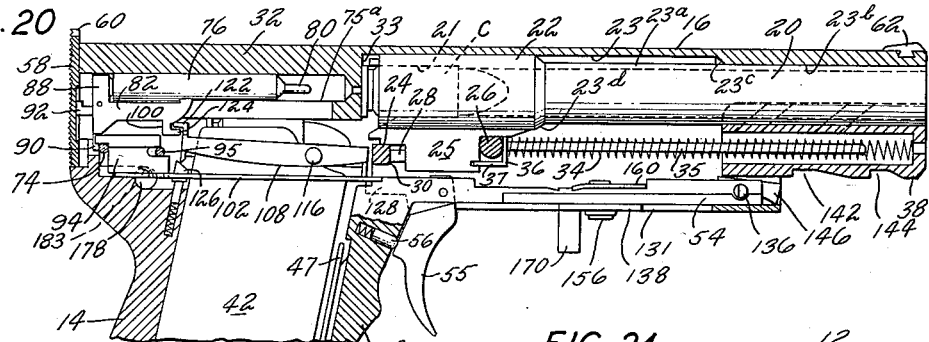
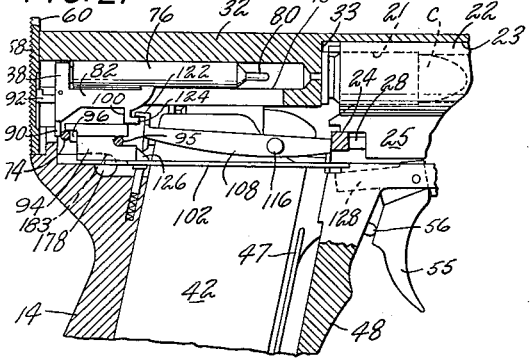
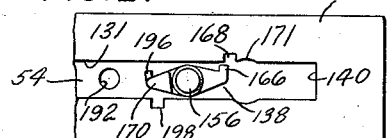
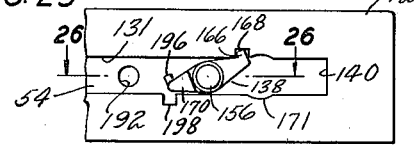
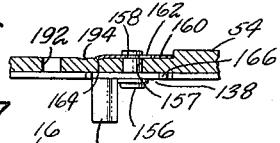
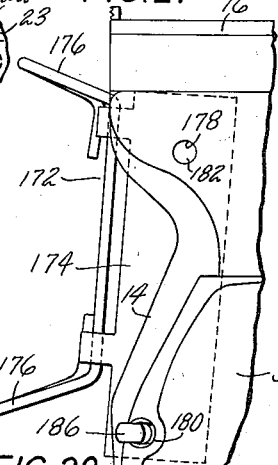
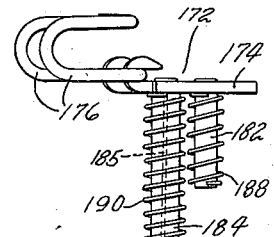
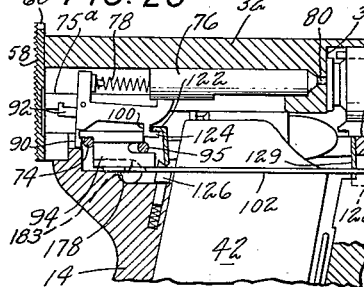
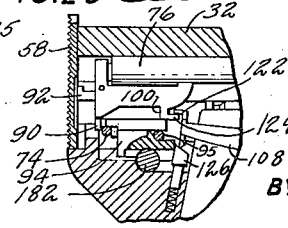
INVENTOR
VAL A. BROWNING
BY *S. Jay Teller*
ATTORNEY Jan. 19, 1960  V. A. BROWNING  2,921,503
AUTOMATIC FIREARM
Filed Aug. 31, 1953  5 Sheets-Sheet 5
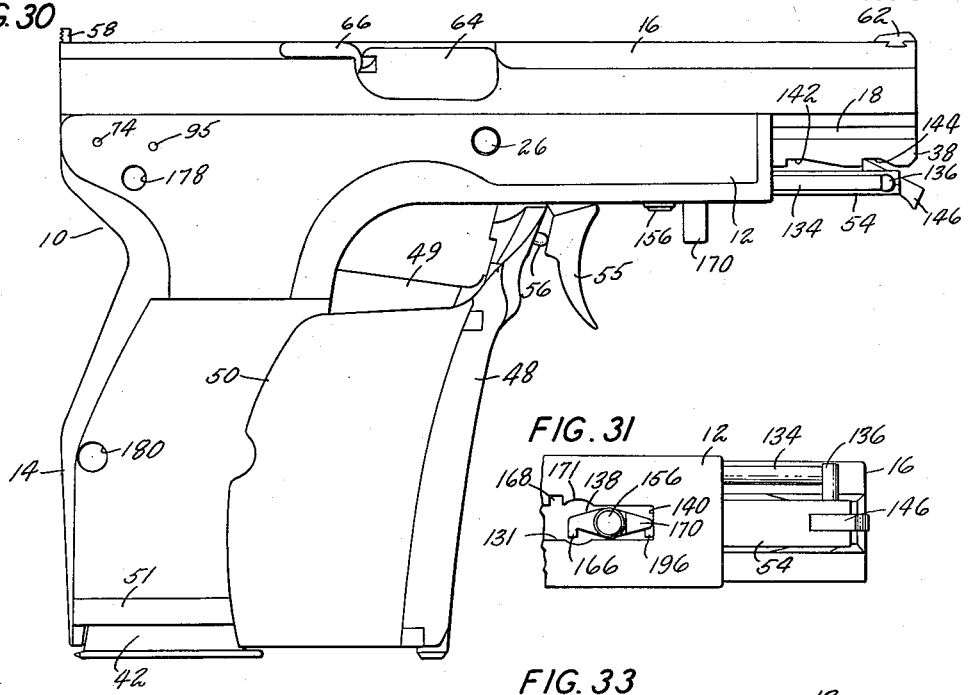
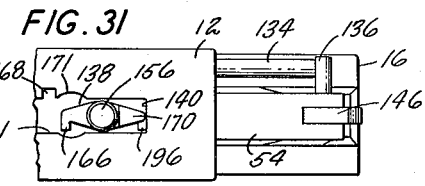
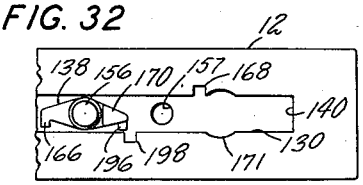
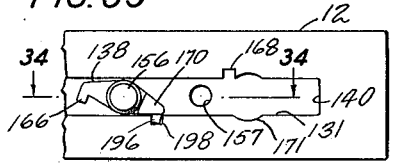
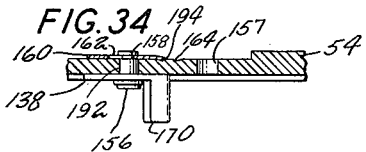
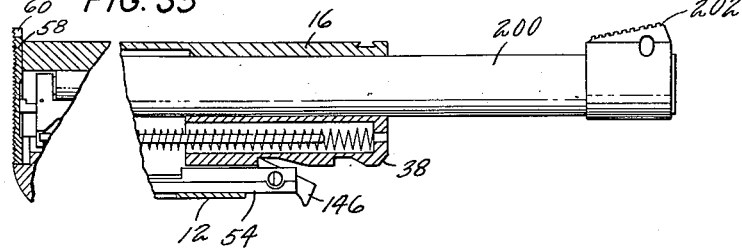
INVENTOR
VAL A. BROWNING
BY *S. Jay Teller*
ATTORNEY

United States Patent Office 2,921,503
Patented Jan. 19, 1960

2,921,503
AUTOMATIC FIREARM

Val A. Browning, Ogden, Utah

Application August 31, 1953, Serial No. 377,295

62 Claims. (Cl. 89—195)

The invention relates to an automatic firearm and as to certain phases thereof the invention relates more particularly to an automatic sidearm or pistol. As disclosed herein the firearm or pistol embodying the invention is semi-automatic rather than fully automatic but for simplicity and convenience the term "automatic" is herein used.

One object of the invention is to provide an improved automatic firearm and more particularly an improved automatic pistol of simple construction which is capable of firing a cartridge of higher pressure than it is possible to use in the ordinary "blow back" type of firearm and which is so constructed that the barrel is mechanically held with its axis remaining at all times in a line parallel to the line of sight.

Another object of the invention is to provide an automatic firearm as specified having a frictional means for assuring recoil movement of the barrel in unison with the slide during the interval required for the bullet to leave the barrel.

Another object of the invention is to provide an automatic firearm as specified having a frictional means for braking rearward recoil and return movements of the slide and more particularly for providing a lesser braking action during the return movement.

Still another object of the invention is to provide an automatic firearm and particularly an automatic pistol having an improved firing mechanism which includes a combined cocking and safety block for the sear.

Still another object is to provide a firearm as set forth in the preceding paragraph having a removable locking pin for locking the safety block in its safety position.

A still further object of the invention is to provide an automatic pistol having a removable grip safety member located at the front of the grip instead of in the conventional position at the rear of the grip.

A still further object of the invention is to provide an automatic pistol having a reciprocable retractor which is separate from the slide and which is manually movable for retracting the slide.

A still further object of the invention is to provide an automatic pistol which after the insertion of a filled magazine may be manipulated for loading and cocking and firing by one hand of the user. Such a pistol can be carried absolutely safely with no cartridge in the firing chamber and can be loaded with one hand practically instantaneously, and can be recocked and reloaded with one hand in case of misfire. The pistol preferably has a retractor as set forth in the preceding paragraph and has a manually movable member at the front of the grip which serves as the means for manually moving the retractor.

Various other objects of the invention will be apparent from the drawings and the following description and claims.

In the drawings I have shown in detail preferred embodiments of the invention, but it will be understood that various changes may be made from the constructions shown, and that the drawings are not to be construed as defining or limiting the scope of the invention, the claims forming a part of this specification being relied upon for that purpose.

Of the drawings:

Fig. 1 is a side view of a firearm embodying the invention with the movable grip member and its associated parts in their forward positions, a portion of the grip member being broken away to show concealed parts.

Fig. 2 is a fragmentary front view of the firearm, a portion of the grip member being broken away to show concealed parts.

Fig. 3 is a horizontal sectional view taken along the line 3—3 of Fig. 1.

Fig. 3ª is a fragmentary vertical sectional view taken along the line 3ª—3ª of Fig. 1.

Fig. 4 is a longitudinal vertical sectional view with the several parts in the same positions as in Fig. 1, the said parts being in the positions that they occupy, after the release of the firing mechanism and after the insertion of a filled magazine. For more clearly illustrating the functioning of the firearm it is assumed that there is a cartridge in the chamber of the barrel, this cartridge having failed to fire.

Fig. 5 is a bottom view of the front portion of the firearm with the parts in the positions shown in Figs. 1 and 4, this view showing a retaining latch acting as a stop.

Fig. 6 is a fragmentary exploded perspective view of the front portions of the barrel and slide and of a block connected with the slide.

Fig. 7 is a fragmentary transverse sectional view taken along the line 7—7 of Fig. 1.

Fig. 8 is a fragmentary longitudinal sectional view taken along the line 8—8 of Fig. 7 but with the parts in intermediate positions of rearward movement.

Fig. 9 is a fragmentary rear view of the firearm with the rear cover for the slide in elevated position.

Fig. 10 is a fragmentary vertical sectional view taken along the line 10—10 of Fig. 9, but with the rear cover in its lower position.

Fig. 11 is a fragmentary vertical sectional view taken along the line 11—11 of Fig. 9, but with the rear cover in its lower position.

Fig. 12 is a plan view of the frame and the parts attached thereto, with the slide and its attached parts omitted.

Fig. 13 is an exploded perspective view of certain parts of the firing mechanism in the positions shown in Fig. 20.

Figure 14:
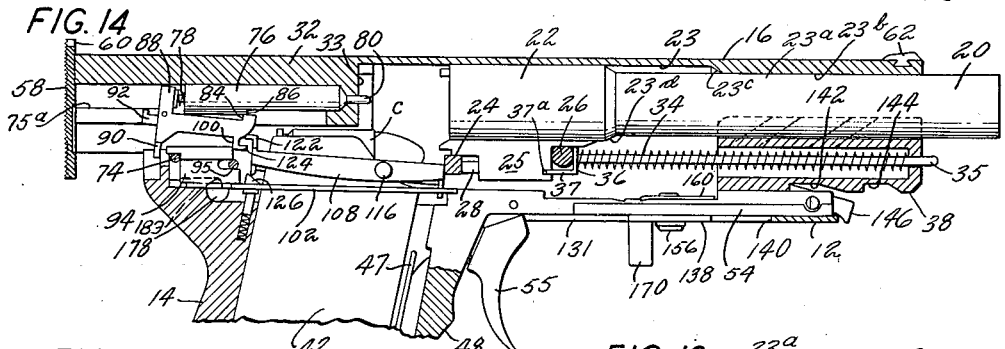
Figure 17:
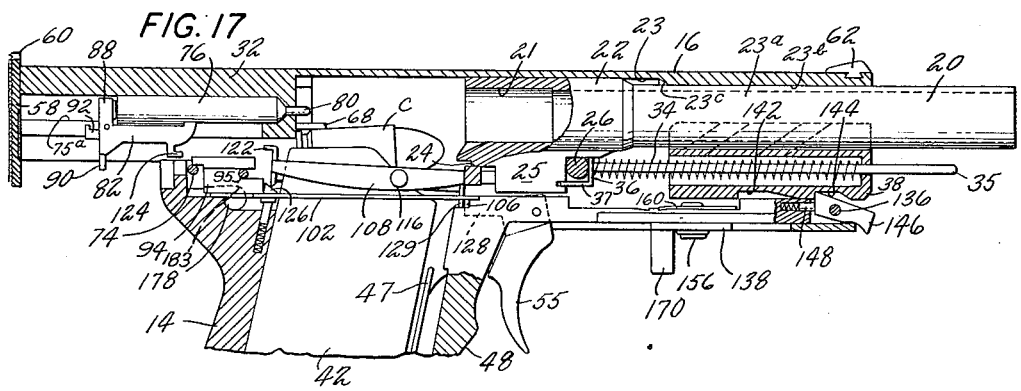

Fig. 14 is a fragmentary longitudinal central vertical sectional view generally similar to Fig. 4 but with the movable grip member and other parts in their rearward positions and with the slide in a position about midway between its fully forward position as shown in Fig. 4 and its fully rearward position as shown approximately in Fig. 17.

Figure 15:
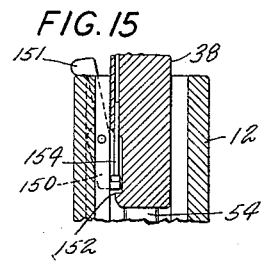

Fig. 15 is a fragmentary horizontal sectional view taken along the line 15—15 of Fig. 2 and showing a latch and associated parts for retaining the slide approximately in the position shown in Fig. 14.

Figure 16:
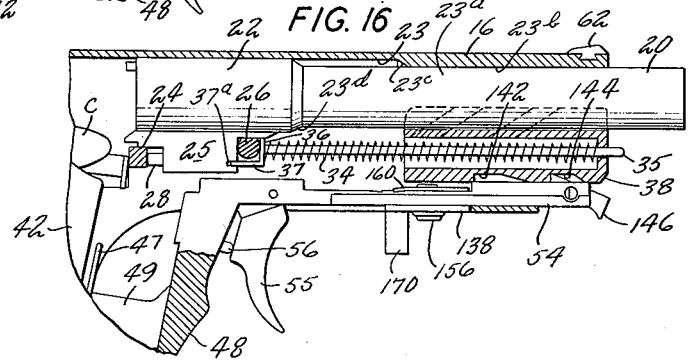

Fig. 16 is a fragmentary view similar to the front portion of Fig. 14 with the slide in approximately the same position but with the movable grip member and other parts again in their fully forward positions.

Fig. 17 is a view similar to Fig. 16 but with the movable grip member and the slide moved nearly but not quite to their rearmost positions.

Figure 18:
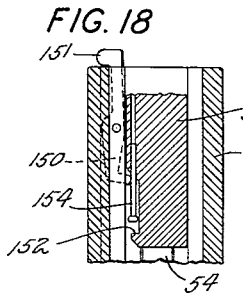

Fig. 18 is a view similar to Fig. 15 showing the retaining latch and associated parts in different relative positions.

Figure 19:
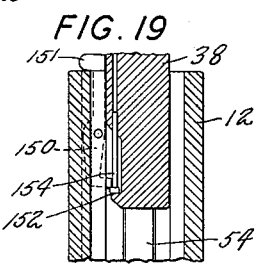

Fig. 19 is a view similar to Fig. 18 but showing the action of the retaining latch and associated parts when the slide moves forwardly.

Fig. 20 is a view similar to Fig. 17 but with the slide and associated parts released and moved to their fully forward positions.

Fig. 21 is a fragmentary view similar to the rear portion of Fig. 20 but with grip member and associated parts moved slightly forwardly.

Fig. 22 is a fragmentary view similar to the rear portion of Fig. 20 but with the trigger released and in firing position.

Fig. 23 is a view similar to Fig. 22 but showing the parts in intermediate relative positions that they assume immediately after firing.

Fig. 24 is a fragmentary bottom view similar to Fig. 5 but showing the parts in the same positions as in Fig. 20.

Fig. 25 is a view similar to Fig. 24 but showing the parts in the same positions as in Fig. 21 and showing the latch in engaged position.

Fig. 26 is a fragmentary sectional view taken along the line 26—26 of Fig. 25.

Fig. 27 is a fragmentary side view similar to the rear portion of Fig. 1 and showing a holding device with which the firearm may be connected.

Fig. 28 is a top view of the firearm holding device which is shown in Fig. 27.

Fig. 29 is a fragmentary sectional view similar to the upper rear portions of Figs. 20 and 22 and showing one of the pins forming a part of the holding device.

Fig. 30 is a view similar to Fig. 1 but showing the movable grip member and associated parts in positions forward of those shown in the said Fig. 1.

Fig. 31 is a view similar to Fig. 5 but showing the latch in an alternative position and showing all parts in the same positions as in Fig. 30.

Fig. 32 is a view similar to Fig. 24 but with the latch in the alternative position shown in Fig. 31.

Fig. 33 is a view similar to Fig. 25 but with the latch in the said alternative position.

Fig. 34 is a fragmentary sectional view taken along the line 34—34 of Fig. 33, this view being similar to Fig. 26 but showing the parts in different positions.

Fig. 35 is a fragmentary view similar to the rear portion of Fig. 1 and the front portion of Fig. 4, but showing an alternative barrel.

General organization

Referring to drawings, particularly Figs. 1 to 4 thereof, 10 represents the main receiver or frame of the firearm, this receiver or frame including a forwardly extending portion 12. When the firearm is a pistol the frame 10 also includes a downwardly extending or depending hollow grip portion or grip 14. A main breech slide 16 is rectilinearly movable rearwardly and forwardly along the top of the frame 10, being guided by tongue and groove formations at 18, 18 extending along the entire length of the slide. The rear portion of the slide constitutes a breechblock as hereinafter set forth.

A barrel 20 having a cartridge chamber 21 is provided, the barrel being preferably movable longitudinally to a limited extent with respect to the frame. The barrel engages the slide 16 and is partly enclosed thereby, the slide being movable rearwardly relatively to the barrel. The barrel and the slide have guiding interengagement for relative longitudinal rectilinear movement. The slide has a downwardly open recess of such width that the barrel during assembly and disassembly is movable upwardly into said recess and downwardly out of said recess. Said recess has a semi-cylindrical surface at the top which fits a barrel portion of corresponding size. A stop is provided for limiting rearward movement of the slide with respect to the frame.

As shown, an enlarged rear portion 22 of the barrel 20 fits or approximately fits a semi-cylindrical surface 23 at the top of said recess in the slide and a smaller front portion $23^a$ of the barrel accurately fits a smaller semi-cylindrical surface $23^b$ at the top of said recess in the slide 16. A rearwardly facing shoulder $23^c$ is provided at the juncture of the slide surfaces 23 and $23^b$. A forwardly facing shoulder $23^d$ is provided at the juncture of the barrel portions 22 and $23^a$. The barrel has a downwardly extending portion at the rear which abuts at the bottom thereof against an upwardly facing shoulder 24 on the frame, the enlarged rear portion 22 of the barrel being thus held at least approximately in guiding engagement with the semi-cylindrical surface 23 in the slide. Means carried by the slide and hereinafter more fully described engages the barrel to hold the front portion $23^a$ thereof in engagement with the second smaller semi-cylindrical surface $23^b$ in the slide.

The barrel is also provided with a downwardly extending lug 25 which fits between walls $25^a$, $25^a$ on the frame, the said walls being shown in Fig. 12. The lug 25 cooperates with the walls $25^a$, $25^a$ to prevent rotative movement of the barrel. The said lug 25 abuts at the front thereof against a transverse pin 26, this pin extending through holes 27, 27 in the sides of the frame which holes are shown in Fig. 12. The lug 25 has a spring-pressed plunger 28 at the rear which abuts against a vertical forwardly facing shoulder 30 on the frame, the said plunger normally holding the barrel in its forward position as determined by the pin 26. When firing occurs and under other conditions as hereinafter explained, the barrel has limited rearward movement to the extent permitted by the said frame shoulder 30. With the parts in positions for firing as shown in Fig. 20 the front end of the barrel may be flush with the front end of the slide.

As shown, the pin 26 has a flat upper surface which engages a horizontal surface on the barrel 20 at the front of the lug 25. Thus the pin 26 cooperates with the shoulder 24 on the frame to assist in holding the rear portion of the barrel at least approximately in guiding engagement with the rear semi-cylindrical recess 23 in the slide.

The rear portion 32 of the slide 16 constitutes the before mentioned breechblock, this being at the rear of the barrel guiding recesses 23 and $23^b$ and at the rear of the barrel. The said breechblock has a recessed shoulder or face 33 which is positioned to engage the head of a cartridge 21 of the barrel when the slide is in forward position. Forward movement of the slide is limited by the engagement of the front face of the breechblock with the barrel, the barrel being held against forward movement by the pin 26.

The slide 16 is biased toward its forward position by a reaction spring 34, the said spring opposing rearward recoil movement of the slide and then imparting a forward return movement thereto. A guide pin 35 is provided within the rear portion of the spring. The reaction spring abuts at its rear against a head 36 which is connected with the guide pin 35 and which is normally held in fixed relationship with the frame. Preferably and as shown, the head 36 engages the said transverse pin 26. The pin 26 is put in place after assembly of the slide and barrel with the frame, and it is readily removable. The width of the head 36 is such that it fits between the walls $36^a$, $36^a$ on the frame, the said walls being shown in Fig. 12. The engagement of the head with the said walls prevents transverse movement of the said head.

The head 36 has a lip 37 which is adapted to engage the barrel lug 25, preferably partly entering a shallow transverse groove $37^a$ therein. When the pin 26 is in place it serves to hold the lip 37 relatively forwardly and out of engagement with the bottom of the groove $37^a$, but when the pin is removed the guide head 36 moves slightly rearwardly until the lip 37 thereof fully enters the said groove in the lug. Thus, with the pin removed, the spring 34 and the guide pin 35 are held in proper relationship when the slide and the barrel are assembled with the frame or disassembled therefrom. Furthermore, when the pin 26 is in place, the arrangement enables the reaction spring 34 to press the said pin between the guide head 36 and the rear portions of the holes 27, 27 in the frame so that the pin is frictionally held against endwise movement out of its proper position. The central portion of the pin has a slightly reduced diameter to provide two shoulders, not shown, which engage the edges of the head 36, the shoulders serving to more positively prevent endwise movement of the pin.

Upon recoil, the barrel and the slide move rearwardly in unison until barrel movement is stopped by the engagement of the rear face of the barrel lug 25 with the frame shoulder 30, as shown in Fig. 23. The slide is free from any positive engagement with the barrel that would cause said slide to move said barrel rearwardly, and the said rearward movement of the barrel in unison with the slide is caused or at least assisted by the frictional connecting means to be described. After rearward barrel movement has been stopped by the frame shoulder 30, rearward recoil movement of the slide continues in opposition to the spring 34 which is held by the pin 26. In the construction shown the rearwardly facing shoulder 23$^c$ on the slide engages the forwardly facing shoulder 23$^d$ on the barrel to limit rearward recoil movement of the slide with respect to the barrel. The barrel lug 25 has previously engaged the frame shoulder 30 to limit rearward movement of the barrel and therefore the barrel shoulder 23$^d$ constitutes the before mentioned stop for limiting rearward movement of the slide with respect to the frame.

*Frictional means for controlling barrel and slide movements*

Means is provided for applying friction to resist or brake the recoil and return movements of the slide and preferably to also frictionally connect the slide and the barrel for purposes to be hereinafter fully set forth. Preferably and as shown, the reaction spring 34 abuts at its front end against a friction block 38 connected with the slide, the spring extending into a longitudinal hole 39 in the said block. The block 38 is engageable with the barrel and is bodily movable with the slide. The said block 38 is also movable to a small extent relatively to the slide and by reason of its engagement with the spring 34 it is biased for relative movement in one direction. Preferably the block is guided for relative movement either in a forward and upward direction or in a rearward and downward direction, and it is biased by the reaction spring for movement in the said forward and upward direction. The top face of the friction block 38 normally engages the bottom of the barrel 20, the said face being shaped to fit the barrel. As best show in Fig. 6, the block 38 preferably has inclined ribs 40, 40 at its sides which enter and fit corresponding inclined grooves 41, 41 in the side walls of the slide. The faces of the ribs 40, 40 constitute cam faces. The direction of inclination of the ribs 40, 40 and the grooves 41, 41 is such that the force of the spring 34 normally serves to bias the block forwardly and upwardly against the bottom of the barrel. By reason of the spring pressure, the block 38 frictionally engages the barrel when the slide is in its forward position and also during recoil and return movements of the slide. Said block 38 constitutes a generally upwardly biased friction means.

Upon firing, the slide 16 is driven rearwardly by reason of the engagement of the head of the cartridge with the breechblock face 33. The pressure of the powder gases expands the cartridge shell into firm engagement with the walls of the cartridge chamber 21, thus resisting the tendency of the shell to move rearwardly out of the chamber. The frictional engagement of the shell with the chamber walls therefore tends to move the barrel rearwardly. Rearward movement of the barrel is more definitely assured by reason of the friction applied to the barrel by the friction block 38. The frictional forces applied by the cartridge shell and by the block 38 overcome the inertia of the barrel and the drag of the departing bullet and also the action of the spring-pressed plunger 28. Thus the barrel and the slide are locked together and the barrel is assuredly moved rearwardly in unison with the slide until barrel movement is stopped by the frame shoulder 30. The design is such as to insure that the bullet has left the barrel and that the powder pressure has been reduced before the barrel movement is stopped and before the breechblock is separated from the cartridge.

The block 38 continues to apply friction during the continued rearward movement of the slide which results chiefly from its own inertia, this friction damping or braking the said rearward movement. The frictional drag on the block 38 by reason of its engagement with the stationary barrel serves to augment the pressure applied thereto by the spring 34 and the drag therefore serves to relatively increase the braking action. Rearward movement of the slide is stopped, as before stated, by the engagement of the slide shoulder 23$^c$ with the barrel shoulder 23$^d$.

When the slide has been moved rearwardly to the maximum extent, it is returned in the forward direction by the spring 34, friction still being applied by the block 38. Initially this friction cooperates with the spring-pressed plunger 28 to return the barrel to its forward position as limited by the pin 26. During continued forward movement of the slide independently of the barrel, the frictional drag on the block 38 by reason of its engagement with the stationary barrel and by reason of the inclination of the ribs 40, 40 and of the grooves 41, 41 serves to decrease the pressure applied thereto by the spring 34 and the drag therefore serves to relatively decrease the braking action. It will therefore be apparent that the braking action during forward independent slide movement is substantially less than the braking action during rearward independent slide movement. The reduced braking action during forward slide movement compensates for the resistance to forward slide movement that results from the insertion of a cartridge into the barrel chamber as hereinbefore explained. The inclined ribs and grooves constitute means for causing the braking action during the return movement of the slide to be less than the braking action during the recoil movement thereof.

The frictional damping or braking of the slide is a function of the recoil violence and it eases the shocks on the parts resulting from the recoil. The decreasing of the braking action during the return movement of the shell permits the use of a weaker recoil spring than would otherwise be necessary, and this lessens the shocks attendant upon the return movement of the slide. Thus the described locking system makes the firearm particularly adapted for the use of metals lighter than steel. It will be obvious that the locking force and the damping or braking force transmitted by the friction block can be varied at will to conform to different conditions by varying the mass and the length of the friction block, or by varying the angle of the friction block ribs.

The block 38 in addition to applying friction, as has been described, also serves to press the forward portion of the barrel upwardly against the slide recess 23$^b$ when the barrel is in its forward firing position. Thus the barrel is firmly locked in fixed relationship with the slide at the instant of firing. The upward pressure which tends to hold the barrel in its upper position results from the forward pressure applied by the reaction spring, this spring acting through the inclined cam surfaces on the block 38 and on the slide. It will be noted that the accuracy of the pistol is enhanced since the frictional locking system described maintains the barrel at all times in proper relationship with the hereinafter described sights without the necessity for any tilting action or other looseness required by the usual locking systems.

It is during the bullet's movement through the barrel that the barrel is most rigidly held in its seat by the increased pressure of the friction block 38. Thus the block 38 constitutes means dependent upon forward pressure exerted by the reaction spring and operable when the said barrel and slide are in their forward positions for holding the front portion of the barrel in fixed relationship to the slide with respect to relative vertical movement.

It has been stated that the barrel accurately fits the forward semi-cylindrical recess 23ᵇ in the slide. An accurate fit between the rear barrel portion 22 and the rear semi-cylindrical recess 23 is less important, as the front recess 23ᵇ is of sufficient length to serve for accurately guiding and positioning the barrel with respect to the slide when the barrel is pressed into the said recess by the block 38. In fact it may be possible, or even preferable, to provide a small clearance between the rear barrel portion 22 and the slide recess 23, so that the barrel is positioned solely by the slide recess 23ᵇ in cooperation with the block 38.

Magazine and magazine latch

The hollow grip portion 14 of the frame is adapted to receive and enclose a cartridge magazine 42 which may be of conventional construction. The magazine holds a plurality of cartridges that are spring-pressed in the upward direction so that each upper cartridge C is movable to a position where it is held by lips on the magazine, as shown in Fig. 17, and from which it may be moved forwardly into the chamber 21 of the barrel 20, as shown in Fig. 20.

The magazine is retained in place by an automatically engaging spring-pressed latch 43, as shown in Figs. 1 and 2. The latch 43 is formed from a strip of sheet metal and it has oppositely disposed transverse projections 44, 44, as shown in Fig. 2, which enter notches in the front of the grip portion 14 of the frame. These projections serve as pintles for the pivotal movement of the latch. The latch 43 has rearwardly projecting teeth 45 at its lower end adapted to enter apertures in the front wall of the magazine for retaining the said magazine. A coil spring 46 on a stationary transverse pin 46ᵃ serves to bias the lower end of the latch rearwardly, the spring serving to hold the pintles 44, 44 in their notches and also serving to bias the teeth 45 into engagement with the magazine. The said transverse pin serves as a stop for limiting the movement of the latch by the spring. The said latch 43 also has a portion 47 which extends upwardly at the front of the magazine so as to be adapted to constitute a finger piece located near the top of the grip portion and at the front thereof. By pressing rearwardly on the said finger piece 47, the latch 43 can be moved in the counterclockwise direction to release the magazine 42.

Movable front grip member

A forwardly and rearwardly movable grip member 48 is provided at the front of the hollow grip 14 of the frame. The said member is biased forwardly and it is movable rearwardly when the grip 14 is held by the hand of the user. The grip member 48 and its connected parts have various functions as will be explained, one of the functions being to serve as a grip safety member which prevents firing except when the said member is in its rear position.

As shown the grip member 48 is generally U-shaped in horizontal section as shown in Fig. 3 and it partly embraces the hollow grip 14 of the frame. The grip member comprises a metallic front portion and wooden stock plates 49 and 50. The member 48 is movable forwardly and rearwardly, being partly guided for such movement by horizontal ribs 51, 51 on the opposite sides of the grip 14 of the frame. The grip member 48 includes rearwardly extending metallic elements 52, 52 which carry rollers 53, 53, these rollers engaging the bottoms of the ribs 51, 51.

A forwardly extending operating slide or retractor 54 is rigidly connected with or formed as a part of the grip member 48. The slide or retractor 54 is guided in the front portion 12 of the frame for longitudinal movement as hereinafter explained, and the guiding means for the retractor cooperate with the rollers 53, 53 and the ribs 51, 51 to guide the grip member. The slide or retractor 54 has various functions as hereinafter described, one of which is to retract or effect rearward movement of the slide 16. The grip member 48 and the retractor 54 are biased for forward movement by means to be more particularly described. During the functioning of the firearm, as hereinafter described, the grip 14 and the grip member 48 are grasped by the hand of the user so that the grip member and the retractor 54 are moved rearwardly from the positions shown in Figs. 1 and 4. The finger piece 47 for the magazine latch 43 is accessible when the grip member is in a forward position as shown in Figs. 1 and 4 but is inaccessible when the grip member is in its rearmost position.

A pivoted trigger 55 is provided in position to be engaged by the index finger of the user while the remainder of his hand grasps the grip 14 and the grip member 48. For reasons that will be hereinafter explained, the trigger is connected to and is bodily movable forwardly and rearwardly with the grip member 48, being carried by the said slide or retractor 54. The trigger 55 is biased in the counterclockwise direction by a spring-pressed plunger 56. The trigger can function to effect firing only when it and the grip member are in their rearmost positions. As shown in Fig. 1, a trigger guard 57 may be provided, this being also bodily movable with the grip member. The trigger guard is not always necessary and for convenience of illustration it has been omitted from the drawings except in Fig. 1 thereof.

Rear slide cover and sights

The breechblock 32 has a downwardly open recess therein and an operable rear cover 58 is provided for normally closing the said recess at the rear. The cover 58 is preferably vertically slidable and it is best shown in Figs. 9, 10 and 11. By means of a spring-pressed detent 59, the cover 58 can be releasably retained in its upper open position or in its normal lower closed position. When in its lower position, the lower portion of the cover extends into a notch in the rear portion of the frame 10.

When the cover 58 is in its lower position as shown in Fig. 10, the detent 59 enters a notch 59ᵃ having an abrupt shoulder at the top thereof and having an inclined face at the bottom thereof. The abrupt shoulder engages the detent to limit downward movement of the cover beyond the position shown, even when the slide 16 with the said cover is moved rearwardly. The inclined face cams the detent to permit upward movement of the cover. When the cover 58 is in its upper position as shown in Fig. 9, the detent 59 enters a notch 59ᵇ having an abrupt shoulder at the bottom thereof and having an inclined face at the top thereof. The abrupt shoulder engages the detent to limit upward movement of the cover beyond the Fig. 9 position. The inclined face cams the detent to permit downward movement of the cover from the Fig. 9 position.

When the cover 58 is in its normal lower position, a notch 60 in the upper portion thereof constitutes the rear sight for the firearm. The said rear sight cooperates with a front sight 62 on the slide 16 near the front thereof. As has been explained, the barrel is held in fixed relationship with respect to the slide at the instant of firing and it is therefore in fixed relationship with respect to the rear and front sights 60 and 62, accuracy of firing being thus assured. In view of the said fixed relationship between the barrel and the slide, it is possible to substitute a longer barrel projecting at the front of the slide and carrying the front sight. Such a barrel is shown in Fig. 35 and is hereinafter described.

Extraction, ejection and loading mechanisms

Figs. 1 and 4 show the barrel and the bolt in their normal forward positions, and for more clearly illustrating the functioning of the firearm Fig. 4 shows a cartridge C' in the barrel chamber 21. It may be assumed that the firing mechanism has been operated for firing but that the cartridge C' has failed to fire.

The slide 16 has an ejection opening 64 at one side, which may be the right side, this opening being shown in Figs. 1, 7 and 8. The slide carries a spring-pressed pivoted extractor 66 at the rear of the opening, the extractor having a claw 66a which is engageable with a groove in the head of a cartridge shell or of a cartridge in the chamber 21 of the barrel when the slide is in its forward position. When the slide is moved rearwardly relatively to the barrel, the claw 66a of the extractor 66 withdraws the cartridge shell or a complete cartridge from the barrel chamber 21, this occurring either when the slide is moved rearwardly during recoil or is moved rearwardly by manual action as hereinafter described.

An ejector 68 is carried by the main frame near the rear thereof, this ejector having an upper forwardly extending portion which is in a longitudinal groove 75 in the breechblock 32 and is positioned for engagement with the lower left portion of the rear face of a cartridge shell or of an unfired cartridge such as C' being moved rearwardly by the extraction 66. The ejector 68 is movable forwardly and rearwardly to a slight extent and is biased forwardly. When an unfired cartridge such as C' is being extracted and ejected by manual movement of the slide, the motion is relatively slow and the cartridge is moved by the extractor 66 to the intermediate stage shown in Fig. 8. In this stage the barrel is fully forward and the nose of the cartridge has not quite cleared the barrel chamber 21, but the head of the cartridge near the left side thereof has engaged the ejector 68. The engagement with the ejector has tilted the cartridge to the extent permitted by the continued engagement of its nose or bullet with the barrel chamber 21. As rearward movement of the slide is continued slightly beyond the Fig. 8 position, the ejector 68 is moved rearwardly in opposition to its bias. As soon as the nose or bullet of the cartridge clears the barrel chamber, the ejector 68 snaps forwardly to throw the cartridge outwardly through the ejection opening 64 as indicated by the dotted line showing of the cartridge. The snap action of the forwardly biased ejector definitely assures ejection of the cartridge as stated. By reason of the slow slide movement, there would be no certainty of complete ejection if the ejector were stationary.

The ejection action has been described with particular reference to an unfired cartridge such as C' and with particular reference to relatively slow manual retraction of the slide. The ejection action is somewhat different for the ejection of an empty cartridge shell during the very rapid recoil movement of the slide that follows firing. During such ejection the barrel is in its rearward position but there is no bullet and the shell is not retained in the intermediate stage shown in Fig 8. The cartridge shell engages the ejector at high speed and is thrown out through the ejection opening.

To facilitate the insertion and removal of other parts, the ejector 68 is readily attachable and detachable. The beforementioned vertically slidable rear cover 58, when in its raised position as shown in Fig. 9, permits forward removal of the slide 16 and this provides access to the ejector and to other parts. As shown in Figs. 11 and 12, the ejector 68 has a flange 70 near its bottom and projecting toward the left, this flange extending into a short longitudinal groove in the frame below a small rib 71. A spring-pressed plunger 72 engages a transverse pin 74 and serves as means for biasing the ejector to its forward position with its flange 70 entered in the groove in the frame. The flange 70 and the plunger 72 hold the ejector on the frame when the slide 16 is not in place. When the slide 16 is in place, the upper portion of the ejector is entered in the said groove 75 in the slide, as shown in Figs. 9 and 11, and the slide then holds and guides the ejector. After removal of the slide from the frame, the ejector 68 can be detached from the frame by moving it rearwardly in opposition to the spring-pressed plunger 72 and by then moving it upwardly.

When the slide 16 is forward as shown in Fig. 4, the lower face of the breechblock 32 thereof prevents the uppermost cartridge C in the magazine 42 from moving upwardly to the maximum extent. However, when the slide 16 approaches its rear position as shown in Fig. 17, the uppermost cartridge C is moved upwardly by the magazine spring to the extent permitted by the magazine lips and to an inclined position, the upper portion of its head being in front of the lower portion of the shoulder or face 33 of the breechblock 32. During manual operation the slide 16 is moved rearwardly only slightly beyond the Fig. 17 position, but upon recoil after firing the slide by reason of its inertia is moved rearwardly to a somewhat greater extent. In either event, as the slide with its breechblock 32 moves forwardly, the said shoulder or face 33 of the breechblock moves the cartridge C forwardly to disengage it from the magazine 42 and to enter it in the barrel chamber 21 ready for firing.

Firing mechanism

The following description of the firing mechanism refers more particularly to Figs. 4, 13, 14, 20, 21, 22 and 23. Fig. 4 shows the firing mechanism parts in released positions with the slide forward; Fig. 14 shows the slide moved rearwardly to a position such that further movement will effect cocking; and Fig. 22 shows the slide 16 fully forward and shows all of the firing mechanism parts ready for firing. The movement of the slide to effect cocking and loading may result from recoil upon firing, or it may be effected manually as hereinafter explained in detail.

The beforementioned recess in the breechblock 32 includes a partly cylindrical longitudinal firing pin guideway 75a. The guideway has a bottom opening having a width less than the width of the guideway. The firing mechanism includes a firing pin 76 which is guided for longitudinal movement in the guideway 75a. The pin 76 is shown in Fig. 4 as being in its forward position to which it has been moved by a compression firing pin spring 78. A portion 80 of the pin having a reduced diameter is adapted to project through an aperture in the breechblock face 33 for engagement with the primer of a cartridge to effect firing. A sear 82 is provided which is adapted for holding the firing pin in its rear cocked position, the sear having a rearward facing shoulder 84 near the front for engaging a forwardly facing shoulder 86 on the firing pin at the bottom thereof. When the sear is engaged with the firing pin as shown in Fig. 20 the sear is located chiefly below the firing pin. The rear end of the spring 78 abuts against an upward extension 88 on the sear 82 and the spring is between the firing pin and the said sear extension. Forward movement of the sear 82 is limited by a downwardly extending lug 90 thereon which engages the said transverse pin 74 on the frame. The sear carries a spring-pressed plunger 92 which is engageable with the slide cover 58 when the said cover is in its lower position and when the slide is fully forward. Thus the cover 58 and the pin 74 normally cooperate to properly locate the sear.

With the firing pin 76 released, as shown in Fig. 4, the sear 82 is in a clockwise tilted position from its normal firing pin engaging position which is shown in Figs. 20 and 22. In the said tilted position of Fig. 4 the spring 78 tends to return the sear to its normal position, but this is prevented by the engagement of the front end of the sear with the bottom of the firing pin.

When the firing pin 76 and the sear 82 are engaged with each other as shown in Fig. 20, the said shoulders on the firing pin and on the sear cooperate with the spring 78 to normally hold the said pin and sear in fixed relationship with each other so that they constitute a unit which can be freely inserted into or removed from the slide 16 when the cover 53 is raised as shown in Fig. 8. This arrangement makes it possible to readily replace the firing pin and sear unit if and when necessary.

A cocking block 94 is provided on the frame, this being below the major portion of the sear, when the latter is in its cocked position and is fully forward as shown in Figs. 20 and 22. For a reason to be set forth the block 94 is preferably movable to a small extent forwardly and rearwardly. Fig. 21 shows the block 94 in its fully forward position. Fig. 4 shows the said block slightly forward from its rearmost position but not fully forward. The block 94 is guided in part for forward and rearward movement by a transverse pin 95 on the frame, this pin entering a horizontal notch in the forward portion of the block. The block is biased toward its forward position by a spring-pressed plunger 96 which engages the said pin 74. The block 94 has a notch 98, as shown in Fig. 13, which provides clearance for the lug 90 on the sear when the block is in its rearward position, as shown in Fig. 20. The sear 82 has a downward extension 100 near the front thereof, and when the block 94 is in its rearward position and when the sear has been tilted to release the firing pin, as shown in Fig. 4, the extension 100 is at the front of the block.

Connected with or at least engageable with the block 94 and movable therewith is a thin flat element 102. The said block 94 and the said element 102 are sometimes herein referred to collectively as a safety member. The element 102 is shaped to extend around the magazine 42 as shown in Fig. 12, the hereinafter described connector being omitted in order that the element 102 may be more clearly seen. The element 102 has a portion 104 at the front of the magazine which is engageable by a shoulder 106 on the slide or retractor 54 when the grip member and the said slide or retractor are moved rearwardly. Fig. 12 shows the slide or retractor 54 and the shoulder 106 in forward positions. Figs. 13, 20 and 22 show the slide or retractor 54 in its rearward position so that the shoulder 106, not shown in Figs. 20 and 22, engages the front portion of the element 102 to hold it and the block 94 in rearward positions.

An operating element or a connector 108 provides an operating connection between the trigger 55 and the sear 82, this connector being best shown in Fig. 13, which shows the several parts in the same positions as in Fig. 20. The connector 108 may be formed of sheet metal bent to a generally rectangular shape so as to extend around the magazine 42. The connector has side walls 110, 110, a front wall 112 and a rear wall 114. The said connector is pivotally movable with respect to the frame 10 about a transverse axis and is also movable forwardly and rearwardly to a limited extent. Preferably the side walls 110, 110 of the connector carry pivot buttons 116, 116 which enter slots in the side walls of the frame, one of these slots being shown at 118 in Fig. 11. Preferably each slot 118 has a rear portion which is inclined upwardly and rearwardly as shown at 120 and which terminates at the top of the frame. The slot portions 120 enable the connector 108 to be assembled with or disassembled from the frame. With the slide removed and with the connector inclined forwardly and downwardly, the buttons 116 can be entered in the slot portions 120. Then the connector can be moved forwardly and downwardly until the buttons 116 are in the slots 118 as shown in Fig. 11. In this position the connector is movable pivotally and is also movable forwardly and rearwardly.

The rear wall 114 of the connector has an upward projection provided with a rearwardly extending flange 122 which is so positioned as to enter a forwardly open notch 124 in the sear 82 when the sear is in its forward position as shown for instance in Figs. 4, 13 and 20. It has been stated that the connector 108 is movable forwardly and rearwardly, but the extent of such movement is small and the flange 122 always remains in the sear notch 124 when the sear is in its forward position. A spring-pressed plunger 126 on the frame has an inclined face which engages the bottom of the rear wall 114 of the connector. This plunger biases the connector for clockwise movement and also for forward movement.

The trigger 55 has an arm 128 which is horizontal when the trigger is in its pressed position as shown in Figs. 13, 20 and 23. The front wall 112 of the operating element or connector 108 has a downwardly extending lug 129 which is in the path of rearward movement of the trigger arm 128 when the latter is in its said horizontal position as shown in Figs. 13 and 20. Rearward movement of the trigger arm 128 merely moves the connector 108 rearwardly without causing firing.

It has been assumed that the cartridge C' shown in Fig. 4 has remained unfired after the release of the firing mechanism. In order to remove the unfired cartridge and to reload and to cock the firing mechanism, the slide 16 is manually moved fully rearwardly, preferably by the mechanism to be described, and is then released for forward movement by the reaction spring 34. Fig. 14 shows the slide in an intermediate position of rearward movement and the firing pin 76 has been moved rearwardly to a position wherein the shoulder 86 thereon is nearly ready for engagement with the shoulder 84 of the sear 82. The engagement of the extension 100 on the sear with the front of the cocking block 94 has moved the said block to its rearmost position, the said block preventing the sear from moving bodily rearwardly beyond the position shown. Upon rearward movement of the slide and the firing pin slightly beyond the positions shown in Fig. 14, the spring 78 tilts the sear in the counterclockwise direction so that the shoulder 84 thereof snaps into position in front of the shoulder 86 on the pin. This counterclockwise tilting movement of the sear releases the extension 100 thereof from the front of the cocking block 94 and the bottom of the sear extension 100 is free to move rearwardly over the block to a position such as that shown in Fig. 17. A cocked relationship has thus been established between the sear and the firing pin, which relationship is maintained until the sear is released for subsequent firing.

When the slide has been moved manually about to the position shown in Fig. 17, the unfired cartridge C', if any, in the barrel chamber has been extracted and ejected as previously described in connection with Figs. 7 and 8. At or near the Fig. 17 position another cartridge C is moved upwardly by the magazine spring and is ready to be moved forwardly into the barrel chamber. With manual operation, the slide is moved rearwardly slightly beyond the position shown in Fig. 17 and is then released for forward movement by the reaction spring to the forward firing position shown in Fig. 20. During such forward movement from the rearmost position the cartridge C shown in Fig. 17 is moved forwardly into the barrel chamber 21.

The cocking and loading actions have been described with particular reference to the assumption of an unfired cartridge in the barrel chamber and to the manual retraction of the slide. It will be understood, however, that the actions are similar during the normal firing of a cartridge. The principal differences are that during recoil movement after firing the barrel initially moves rearwardly in unison with the slide and that the slide moves rearwardly to a greater extent beyond the Fig. 17 position. The rearward movement of the slide upon recoil is limited by the engagement of its shoulder $23^c$ with the barrel shoulder $23^d$, the barrel having previously moved rearwardly so that its lug 25 is held by the frame shoulder 30.

When the parts have been moved forwardly to the Fig. 20 position after manual operation, the sear is definitely positioned by the cover 58 and the pin 74. The flange 122 on the connector 110 is within the notch in the sear. The grip member 48 and the slide 54 are in their fully rearward positions and the trigger 55 is in its fully rearward firing position. The trigger arm 128 has engaged the lug 139 on the connector to move the connector 108 to its rearward position, but such movement of the connector has not caused firing. The shoulder 106 on the slide 54 has engaged the safety element 102 to move it and the block 94 to their rearward positions. The front of the block 94 is behind the downward extension 100 of the sear so that the sear is free to be moved in the clockwise direction. The mechanism is ready for firing, except that no operative connection has been established between the trigger 55 and the sear 82.

The block 94 has been described as a cocking block but from the foregoing description it will be apparent that it also serves as a safety block. It is movable longitudinally and it has a forward safety position as shown in Fig. 21 in which it is in the path of sear movement to prevent the sear from releasing the firing pin and it has another position as shown in Fig. 20 in which it is out of the path of sear movement. It will be apparent that the member 48 acts as a grip safety member. With the member 48 in its rearward position, as shown in Fig. 20, the safety block 94 is held in its rearward position to permit movement of the sear to release the firing pin. With the member 48 located otherwise than in its rear position, the safety block 94 is in its forward safety position.

It sometimes happens that, after the parts are moved to the fully loaded and fully cocked positions shown in Fig. 20, immediate firing is not desired. In such event, the grip member 48 may be permitted to move slightly forwardly to the safety position shown in Fig. 21. Suitable means, as hereinafter described, may be provided for holding the grip member in this position. If the grip member is forward from its rearward position to the extent shown in Fig. 21, firing cannot occur. One reason for this is that the shoulder 106 on the slide 54 has released the safety member which comprises the block 94 and the element 102. The plunger 96 moves the safety member slightly forwardly so that the front of the block 94 is below the bottom of the front sear extension 100 as shown in Fig. 21. With the block 94 in the safety position shown in Fig. 21 the sear cannot be moved to release the firing pin and the firearm is fully safe as concerns accidental firing. It will be observed that the described safety member constitutes means for causing the firing mechanism to be operative when the grip safety member is in its rearward position and to be inoperative when the grip safety member is in its forward position.

When the grip safety member is forward as shown in Fig. 21, firing is also prevented for the reason that the trigger has moved forwardly with the grip member and cannot engage the connector 108. With the trigger in the Fig. 21 position, the trigger bar 128 would move in front of the connector lug 129 without engaging it. It will be observed that the connector lug 129 and the forwardly movable trigger bar 128 constitute a second means for causing the firing mechanism to be operative when the grip safety member is in its rearward position and to be inoperative when the grip safety member is in its forward position. It will be observed that the trigger 55, 128 is operatively engageable with the operating element or connector 108 when the grip member and the trigger are in their rearward positions. The trigger is out of engaging relationship with said operating element or connector when the grip member and trigger are in their forward positions.

In order to condition the firing mechanism for immediate firing after being moved to the Fig. 20 position, the trigger 55 is released while maintaining the grip member 48 in its rearward position. The trigger moves to the position shown in Fig. 22, the trigger arm 128 moving downwardly to permit the connector 108 to move forwardly. The said connector is so moved by the plunger 126, and the lug 129 thereof is moved above the rear portion of the trigger arm 128. The trigger may now be pressed for firing. As the trigger is pressed, the connector 108 is moved counterclockwise so that the flange 122 thereof tilts the sear 82 in the direction to move the front end thereof downwardly. As the front end of the sear moves downwardly, it releases the firing pin 76 which is then driven forwardly by the spring 78 to effect firing.

Assuming proper firing, the recoil action moves the barrel and slide to the intermediate positions shown in Fig. 23. In moving from the position shown in Fig. 22 to the positions shown in Fig. 23, the barrel and the slide remain in fixed relationship with each other, being frictionally locked as previously explained. In the Fig. 23 positions, the lug 25 on the barrel engages the shoulder 30 on the frame to limit further barrel movement, but the rearward movement of the slide continues to a position beyond that shown in Fig. 17. During movement of the slide from the Fig. 23 position to and beyond the Fig. 17 position, friction is applied by the block 38 as previously described, so as to brake the rearward movement of the slide. After movement of the slide to its rearmost position the reaction spring 34 moves the slide forwardly to the position shown in Fig. 20. During rearward and forward movements of the slide, extraction and ejection and cocking and loading take place as previously described.

If the grip member 48 is still held in its rearward firing position and if the trigger 55 is still pressed when the slide returns to its forward position, no further immediate firing will occur as the firing mechanism parts will be in the Fig. 20 positions. For further firing the trigger must be released and then pressed as previously described.

When firing is to be effected after the parts have been moved to the safety position shown in Fig. 21, it is merely necessary to move the grip member 48 rearwardly without pressing the trigger. This moves the several parts to the positions for firing as shown in Fig. 22.

*Slide moving mechanism*

An automatic pistol embodying the invention has a longitudinally reciprocable retractor such as 54 additional to the slide 16 for moving the said slide rearwardly. Manual means is provided for moving the retractor 54 rearwardly, and this means is preferably the before described member 48. When the retractor is movable by the grip member, the pistol can be operated entirely by one hand of the user. By the use of only one hand the slide can be moved rearwardly for cocking and for the ejection, if necessary, of an unfired cartridge, loading or reloading taking place during automatic forward movement of the slide.

The grip member 48 is movable forwardly and rearwardly through a substantial distance, and Figs. 1 and 4 show it in its forward position. The before-mentioned retractor 54 is rigidly connected with the grip members and has longitudinal tongues 130, 130 which are guided in corresponding grooves in the forward portion 12 of the frame as shown in Fig. 2. The upper portion of the grip member 48 which is connected with the retractor 54 extends through a longitudinal slot 131 in the bottom of the frame portion 12, the forward portion of this slot being shown in Fig. 5. The pivoted trigger 55 also extends through the said slot 131. The said grip member 48 and the retractor 54 are biased to their forward positions by a spring 132 in a longitudinal hole in the frame as shown in Fig. 12, the said spring acting through a longitudinally movable tube or rod 134 which abuts at its front end against a short transverse pin 136 on the front portion of the retractor 54. As shown in Fig. 5, forward movement of the grip member 48 and the retractor 54 is limited by a member 138. The member 138 is adapted to also serve as a latch as hereinafter explained. The said member is on the bottom of the retractor 54 and is within the said slot 131 in the bottom of the frame portion 12. The member 138 abuts against the front end 140 of the said slot and therefore limits forward movement of the grip member 48 and of the retractor 54.

A releasable means such as a latch is provided for connecting the retractor 54 with the slide to enable the said retractor to move the said slide rearwardly in opposition to the reaction spring 34. Preferably a means with which the slide 16 is longitudinally movable has a notch adjacent the retractor and positioned to be engaged by the latch. When a friction block such as 38 is provided, this block constitutes the said longitudinally movable notched means.

As shown, the block 38 has at least one notch in the bottom thereof and as shown it has two longitudinally spaced notches 142 and 144. The retractor 54 carries near the front thereof a pivoted latch 146 adapted to enter one or the other of the notches 142 and 144, the latch being preferably pivoted on the pin 136. As shown in Fig. 17, a spring-pressed plunger 148 biases the latch 146 for movement into the notches.

With the grip member 48 and the retractor 54 initially forward as shown in Fig. 4 and with the latch 146 entered in the notch 142, the block 38 and the slide 16 are moved rearwardly in opposition to the reaction spring 34 when the grip member is moved rearwardly. For moving the retractor, the user grasps the grip 14 and the grip member 48 so as to move the latter rearwardly. Preferably in moving the grip member the user places his index finger on the trigger 55, this materially assisting in the rearward movement. The engagement of the trigger cannot in any event effect firing as will be explained. The rearward movement of the grip member moves the parts to positions slightly beyond those shown in Fig. 14. When the slide has been moved as stated it is not in its fully rearward position but is in an intermediate position.

Motion is transmitted to the slide 16 through the block 38. As has been explained, the block 38 is connected with the slide for relative forward and upward movement or relatively rearward and downward movement. When sufficient pressure is applied to the block 38 to overcome the spring 34, the block moves to a slight extent in the said downward and rearward direction with respect to the slide and with respect to the barrel. The relative rearward and downward movement of the block is limited by the engagement of the bottom thereof with the top of the retractor 54. After the block has moved rearwardly and downwardly with respect to the slide 16 to the extent stated, the block is then moved rectilinearly in the rearward direction and the slide 16 is moved in unison with the block. It has been pointed out that the block 38 normally serves to frictionally connect the barrel with the slide so that the barrel and slide initially move rearwardly in unison. After rearward movement of the barrel has been stopped and during continued relative movement of the slide the said block 38 normally serves to frictionally resist or brake the rearward slide movement. However, when rearward pressure is applied to the block and when the block moves relatively rearwardly and downwardly as described, the block is separated from the barrel and there is no friction. It will therefore be apparent that during manual movement of the slide by the retractor the barrel remains in its forward position and there is no braking action to resist the slide movement.

With the parts in the Fig. 14 position or slightly beyond it and with the slide in the said intermediate position a retaining means acts automatically to temporarily retain the slide in the said intermediate position and to prevent immediate forward movement thereof. Preferably a latch 150, as shown in Fig. 15, enters a third notch 152 in the side of the means longitudinally movable with the slide, that is, in the block 38, to retain the said means or block and to thus retain the slide. The latch 150 is pivoted in the frame for movement in the counterclockwise direction. The latch 150 has a forward portion 151 which is exposed so that the latch may be manually released when desired.

Fig. 14 shows the forward tail of the latch 146 engaged with the front portion 12 of the frame so that the latch is being forced in the counterclockwise direction and out of the notch 142. When the parts are moved slightly beyond the Fig. 14 position, the latch is forced entirely out of the notch and the block 38 is released from the latch. In the meantime cocking of the sear 82 has been completed as previously described. The reaction spring 34 then tends to move the block forwardly but it can so move to only a very small extent as it will be stopped by the engagement of the retaining means or latch 150 with the end of the block notch 152.

As soon as the latch 146 is free from the notch 142, the user relaxes his grip sufficiently to permit the grip member 48 and the retractor 54 to again move fully forwardly. Fig. 16 shows the said parts fully forward with the latch 146 engaged in the forward notch 144 in the block 38. The grip member and the retractor are then again moved rearwardly, the action being the same as previously described and the slide being moved to its fully rearward position. During the movement of the slide to the fully rearward position a cartridge is moved upwardly by the magazine spring so as to be in position for loading. Fig. 17 shows the slide in a position slightly forward from its fully rearward position. The forward tail of the latch 146 is again engaged with the front portion 12 of the frame so that the latch is being forced in the counterclockwise direction out of the notch 144. When the parts are moved slightly beyond the Fig. 17 position, the latch is forced entirely out of the notch and the block 38 is released from the latch. The reaction spring 34 then moves the block and the slide 16 to their fully forward positions as shown in Fig. 20. During the forward movement of the slide, the cartridge C as shown in Fig. 17 is pushed forwardly into the barrel chamber to complete the loading operation. When the block and slide move forwardly, the grip member 48 and the retractor are preferably retained in or near their rearward positions, as shown in Fig. 20 or in Fig. 21. With the parts in the Fig. 20 position, the latch 146 is held in its inoperative position so that it does not interfere with the function of the pistol during firing.

Means is provided as shown in Figs. 18 and 19 for preventing the slide retaining means or latch 150 from interfering with the movement of the block 38 and slide 16 forwardly to their Fig. 20 positions after they have been moved rearwardly somewhat beyond their Fig. 17 positions and then released. A headed longitudinal pin 154 is mounted in a longitudinal hole in the block 38, the head of the pin being at the rear and near the rear end of the block notch 152. The pin 154 is longitudinally movable to a small extent relatively to the block 38, the pin having a relative forward position as shown in Figs. 15 and 18 or a relative rearward position as shown in Fig. 19.

When the block 38 is moved rearwardly from the Fig. 15 position, as for instance to the Fig. 18 position, the head of the pin 154 cams the latch 150 in the clockwise direction to permit movement of the block. However, when the block 38 moves forwardly from its fully rearward position to the forward Fig. 20 position, the rear end of the latch 150 engages the head of the pin 154 to momentarily retard or stop the forward movement of the pin in unison with the block 38, the pin in effect moving rearwardly relatively to the said block. Relative rearward movement of the pin 154 is stopped by the engagement of its head with the rear of the notch 152 in the block as shown in Fig. 19. Then the latch is cammed past the head of the pin without entering the notch 152 and the block 38 is permitted to continue its forward movement. During the next rearward movement of the block 38, the latch 150 moves the pin 154 relatively forwardly to the Fig. 15 position so that the latch can enter the notch 152.

From th foregoing description it will be apparent that the slide can be withdrawn to its fully rearward position and then released for forward movement solely by using one hand for moving the grip member 48. The grip member has two successive similar movements for moving the slide rearwardly in two stages to its fully rearward position. Therefore one hand manipulation of the pistol can serve for initial loading after replacing an empty magazine with a filled magazine or it can serve to clear the barrel chamber in the event that there is an unfired cartridge therein.

It has been pointed out that the magazine latch has a finger piece 47 located near the top of the grip portion 14 and at the front thereof. Access to the finger piece is obstructed when the grip member 48 in its rearward position, as shown for instance in Fig. 20. However, the finger piece is accessible for moving the latch to release the magazine when the grip member is forward as shown in Fig. 1 or in Fig. 30. This is a safety provision as it prevents removal of the magazine except with the grip member and with the retractor at least partly forward. Therefore, if the magazine is removed with a live cartridge in the barrel chamber, the said cartridge cannot be fired as it will be extracted and ejected upon movement of the slide rearwardly and before the parts are in position for firing.

Latch for retaining firearm in safety position

Frequently and as previously explained, it is sometimes desirable after loading and with the parts in the Fig. 20 position, to retain the grip member 48 and its associated parts in safety positions slightly forward from the Fig. 20 positions, the safety positions being shown in Fig. 21.

The latch 138 shown in Fig. 5 and previously briefly referred to is more fully shown in Figs. 24 to 26. The latch is carried by the retractor 54 and is located at the bottom of the slide and within the said slot 131 in the front portion 12 of the frame. Referring particularly to Fig. 26, the latch is pivotally movable on a headed vertical pin 156 extending through a hole 157 in the retractor 54. The pin 156 has an annular groove 158 therein immediately above the retractor 54 and a small leaf spring 160 is provided which is initially slightly bowed upwardly between its ends. The spring 160 has a keyhole shaped aperture 162 therein, the larger portion of the aperture being adapted to receive the upper end of the pin 156 and the smaller portion of the aperture being of such size as to receive and fit the pin within the annular groove 158. For assembly, the latch 138 and the pin 156 are put in place and then the spring 160 is put in place with the upper end of the pin entered in the larger portion of the spring aperture. After that the spring is moved forwardly until the smaller portion of the aperture fits within the groove in the pin. The retractor 54 has a small transverse shoulder 164 for engaging the rear end of the spring to prevent relative longitudinal movement of the spring. For disassembly the spring 160 is disengaged from the shoulder 164 and the described movements are reversed. By reason of the fact that the spring 160 is flexed downwardly from an initial bowed condition, the said spring applies upward pressure on the pin 156 so as to frictionally hold the latch 138 in any position to which it may be moved.

The latch 138 has a tooth 166 for entry into a notch 168 in one side of the slot 131, and the said latch has a downwardly extending finger piece 170 by which it may be conveniently moved. Fig. 24 shows the parts in the same positions as in Fig. 20, the tooth 166 of the latch being at the rear of the notch 168. Unless manually moved, the latch 138 has no function other than to serve as a stop as previously explained in connection with Fig. 5.

Fig. 25 shows the several parts in the same positions as in Fig. 21, that is, in the safety position. The parts may be retained in the said safety position by engaging the finger piece 170 to move the latch 138 so that its tooth 166 enters the notch 168. The finger piece 170 of the latch is so located that it may be engaged by one finger of the same hand that grasps the grip 14 and the grip member 48. The latch 138, when engaged as shown, prevents further forward movement of the grip member 48 and the retractor 54 and it maintains the parts of the firearm in convenient position for carrying or for subsequent firing. When the parts are to be moved to the firing position shown in Fig. 22, it is merely necessary to move the grip member 48 rearwardly. The latch 138 will be cammed out of the notch 166, no separate manual movement of the latch being necessary.

Disassembly and assembly

The firearm can be readily disassembled and assembled without the use of special tools. The procedure for disassembly will be described, it being understood that this procedure is reversed for assembly.

For disassembly, the first step is to remove the transverse pin 26 and the nose of one of the cartridges C can be used to start the movement of the pin. By reason of the lip 37 of the head 36, the general relationship of the reaction spring 34 and the barrel 20 is not immediately affected by the removal of the pin 26.

After removal of the pin 26 the rear slide cover 58 is raised to free the slide for forward movement, care being taken that the sear and firing pin are in engaged relationship. The sear and firing pin can be removed rearwardly as a unit. Then the slide and attached parts can be removed forwardly, the latches 146 and 150 being manually held, if necessary, to prevent them from interfering with slide movement. The ejector 68 can be removed as previously described and the connector 108 can be removed as previously described.

With the slide 16 removed from the frame, the block 38 can be removed from the slide by moving it downwardly and rearwardly as guided by the ribs 40, 40. When the block is free from the slide, the reaction spring 34 and the rod 36 are freely removable from the block. With the block 38 removed as above described, the barrel is freely separable from the slide by relative downward movement.

For removing the grip member 48 and the retractor 54 from the frame, the latch or stop 138 is first removed. Then the grip member and retractor are moved forwardly until the trigger 55 abuts against the front edge 140 of the slot 131. This forward movement permits the tube or rod 134 and the spring 132 to be disconnected. The said forward movement also entirely frees the grip member from the grip 14 and from the guide flanges 51, 51 thereon. In addition, the said forward movement causes the longitudinal guide tongues 130, 130 on the retractor to pass forwardly out of the corresponding grooves in the frame portion 12. Then the grip member 48 and retractor 54 are swung 90° in the counterclockwise direction about the front end 140 of the slot 131, the retractor being then vertical. While maintaining the retractor vertical, the grip member and retractor are moved rearwardly until the retractor registers with an enlargement of the slot 131 as shown at 171 in Figs. 5, 12, 25, and 33. Then the parts are swung 90° in either direction about a vertical axis through the center of the retractor, the enlargement 171 being of such size as to permit this movement. After that the parts can be moved vertically downwardly, the retractor 54 moving through the enlargement 171 and out of engagement with the frame portion 12.

Safety locking pin and holder for pistol

It has been stated that the block 94 has a forward safety position as shown in Fig. 21, the said block being biased to the said position. In accordance with one phase of the invention a safety locking pin is engageable with the frame and is movable into and out of a position in which it engages the safety block to lock it in its said safety position. This safety locking pin may advantageously be a part of a carrier or holder for the pistol.

A holder 172 for the pistol may be provided as shown in Figs. 27 and 28. Fig. 27 is a fragmentary side view similar to Fig. 1 but showing the holder in place. The grip member is in the safety position shown in Fig. 21, but only the stock plate 50 of the grip member is shown.

The holder 172 comprises a flat plate 174 adapted to be located adjacent the upper rear portion of the pistol frame 10 at the left side thereof. The plate 174 is provided with the hooks or loops 176 for engagement with the belt of the user. The frame 10 is provided with transverse first and second holes 178 and 180, which are shown as being vertically spaced. The plate 174 has first and second pins 182 and 184 of such sizes and so spaced that they are adapted respectively to enter the said first and second holes 178 and 180 as shown in Fig. 27. The lower or second pin 184 is longer than the upper or first pin 182 so that it can extend entirely through the frame. The said pin 184 is hollow and a spring 185 is located within it, the spring carrying a hook 186. The hook is of such size that it can pass through the hole 180 and it is so biased by the spring that it engages the right face of the frame 10 when the holder is in place. Coil springs 188 and 190 surround the pins 182 and 184 so as to hold the plate 174 in spaced relationship with the frame 10.

The upper or first pin 182 of the holder constitutes the before mentioned locking pin. The upper or first hole 178 for the locking pin 182 is so located that the safety block 94 prevents insertion of the first or locking pin 182 when the block is in its rearward position as shown in Figs. 20 and 22. However, when the block 94 is in its forward safety position as shown in Fig. 21, the first or locking pin 182 can be inserted behind a partly cylindrical shoulder 183 on the said block 94. With the block 94 in its forward safety position the shoulder 183 registers with the hole 178 into which the pin 182 may be inserted. The shoulder 183 is in the left portion of the block 94 and terminates at a central longitudinal groove in the bottom of the block, the pin 182 being of corresponding length as shown in Fig. 28. The portion of the block at the rear of the shoulder 183 is cut away as best shown in Fig. 4. The location of the shoulder 183 at the left leaves space at the right for the element 102 to be connected with the bottom of the block 94 as shown in Fig. 13.

Fig. 29 is similar to the upper rear portion of Fig. 21, but shows the locking pin 182 in place and in engagement with the shoulder 183. It will be observed that the pin 182 holds the block 94 in its forward safety position. With the block in this position the sear cannot be released. It will be evident that the holder 172 when engaged with the firearm prevents any release of the sear and therefore makes the firearm entirely safe.

Alternative slide moving mechanism

As thus far described, the mechanism for moving the slide 16 rearwardly involves two successive movements of the grip member 48 in order to move the slide 16 to its fully rearward position. Alternatively, the slide 16 may be moved to its fully rearward position by a single longer movement of the grip member 48 and the retractor 54.

The adaptation of the pistol for a single long grip member movement instead of two shorter grip member movements involves only a relocation of the stop or latch 138 so that the grip member 48 and the retractor 54 may move further forward to the positions shown in Fig. 30.

In addition to the hole 157 for the latch pin 156, the retractor 54 has a second similar hole 192 spaced rearwardly from the hole 157. In order to adapt the pistol for a single long grip member movement the latch 138 is shifted rearwardly so that its pin 156 is in the hole 192. At the same time the position of the latch is reversed. For holding the latch 138 in its reversed position, the spring 160 is also reversed as shown in Fig. 34, and it engages a shoulder 194 in the slide instead of the shoulder 164 as shown in Fig. 26. With the latch in the new position it permits the grip member 48 and the slide 34 to move further forward. Fig. 31 shows the latch 138 acting as a stop to limit forward movement of the grip member and retractor in the positions shown in Fig. 30, the said latch engaging the front end 140 of the slot 131.

With the parts in the Fig. 30 position, the latch 146 enters the forward notch 144 in the block 38. A single movement of the grip member 48 and the retractor 54 moves the parts to and slightly beyond the position shown in Fig. 17. The reaction spring then returns the slide to the position shown in Fig. 20. Except for the single long movement of the grip member 48 and the retractor instead of two short movements the functioning of the pistol is exactly as previously described.

The latch 138 in its second position is adapted to hold the grip member and associated parts in the safety position shown in Fig. 21. For this purpose the latch 138 has a second tooth 196 which enters a second notch 198 in the opposite side of the slot 131. When the parts are to be moved rearwardly to the firing position shown in Fig. 22, it is merely necessary to move the grip member 48 rearwardly. The latch 138 will be cammed out of the notch 198, no separate manual movement of the latch being necessary.

When the firearm is to be operated by a single movement of the grip member, the rear notch 142 in the block 38 is unnecessary but it does not interfere with proper functioning. The retaining means or latch 150 for the block 38 and its associated parts are also unnecessary but they do not interfere with proper functioning. If the firearm is to be constructed so as to be used only with a single movement of the grip member, the notch 142 in the block 38 can be omitted and the retaining means or latch 150 and its associated parts can be omitted.

It will be seen that the pistol as shown and described is adapted either for two-movement retraction or one-movement retraction as may be preferred. To adapt the pistol for either type of retraction movement it is only necessary to shift the latch 138 as described.

Alternative barrel

In lieu of the barrel 20 that has been shown and described, a longer barrel may be substituted as before stated. A longer alternative barrel 200 is shown in Fig. 35. The rear portion of the barrel 200 is exactly like the rear portion of the barrel 20. However, the longer barrel 200 projects forwardly to a substantial extent beyond the slide 16. The longer barrel 200 carries a front sight 202 which cooperates with the before mentioned rear sight 60. The sight 62 on the slide 16 is omitted. Inasmuch as the barrel and the slide interengage each other for rectilinear relative longitudinal movement as previously described, accurate sighting is obtained by a front sight on the barrel itself, and this substantially increases the sight radius. Such a mounting of the front sight would not be satisfactory with a conventional pistol wherein the barrel is movable relatively to the slide otherwise than longitudinally.

The invention claimed is:

1. The combination in an automatic firearm, of a frame, a longitudinally movable barrel, means on the frame for limiting longitudinal barrel movement, a longitudinal breech slide guided for longitudinal movement along the frame independently of the barrel, a guide member bodily movable with the slide and having a longitudinal surface engaging the front portion of the barrel at least at the bottom thereof which member has an inclined cam surface thereon and serves when in its uppermost position to hold the front portion of the barrel with its axis in fixed relationship with the slide while permitting relative longitudinal rectilinear movements, cam means on the slide having an inclined cam surface engaging the said cam surface on the guide member, and a longitudinal reaction spring for opposing recoil movement of the slide and for then moving it forwardly which spring has its rear end held in fixed relation to the frame and which spring is connected to apply longitudinal pressure tending to effect relative longitudinal movement between the guide member and the slide in the direction to cause the said cam surfaces to bias the guide member to its uppermost position.

2. The combination in an automatic firearm, of a frame, a slide guided for longitudinal movement along the frame which slide includes a rear breechblock and has a rearward recoil movement upon firing, the said slide having a downwardly open recess at the front portion thereof which recess has a semicylindrical surface at the top and has a minimum width at least as great as the width of said semicylindrical surface, a longitudinal reaction spring for opposing the recoil movement of the slide and for then imparting a forward return movement thereto, a longitudinally movable barrel positioned at the front of the breechblock and having a front portion fitting the said semi-cylindrical recess in the slide, the said front portion of the barrel during assembly and disassembly being movable upwardly into said recess or downwardly out of said recess and the said front portion of the barrel cooperating with the said slide recess to permit relative longitudinal movement between the barrel and slide, and means within said slide recess and below the barrel for engaging the front portion of the barrel to hold the said front portion in engagement with the said semi-cylindrical top surface of said slide recess when the said barrel and slide are in their forward positions.

3. The combination in an automatic firearm, of a frame, a slide guided for longitudinal movement along the frame which slide includes a rear breechblock and has a rearward recoil movement upon firing, the said slide having a downwardly open recess at the front portion thereof which recess has a semicylindrical surface at the top and has a minimum width at least as great as the width of said semicylindrical surface, a longitudinal reaction spring for opposing the recoil movement of the slide and for then imparting a forward return movement thereto, a longitudinally movable barrel positioned at the front of the breechblock and having a front portion fitting the said semi-cylindrical recess in the slide, the said front portion of the barrel during assembly and disassembly being movable upwardly into said recess or downwardly out of said recess and the said front portion of the barrel cooperating with the said slide recess to permit relative longitudinal movement between the barrel and slide, and means within said slide recess and below the barrel and dependent upon forward pressure exerted by the reaction spring for pressing the front portion of the barrel upwardly to maintain it in engagement with the said semi-cylindrical top surface of said slide recess.

4. The combination in an automatic firearm, of a frame, a slide guided for longitudinal movement along the frame which slide includes a breechblock and has a rearward recoil movement upon firing, the said slide having a downwardly open recess at the front of the breechblock which recess has a semicylindrical surface at the top of the rear portion thereof and which recess has a smaller semicylindrical surface at the front of the first said surface, a longitudinal reaction spring for opposing the recoil movement of the slide and for then imparting a forward return movement thereto, a longitudinally movable barrel positioned at the front of the breechblock and having a rear portion fitting the first said semicylindrical slide recess surface and having a smaller forward portion fitting the second said semicylindrical slide recess surface, the said barrel during assembly and disassembly being movable upwardly into said recess and downwardly out of said recess and said portions of the barrel after assembly cooperating with the said slide recess surfaces to serve as guides for relative longitudinal rectilinear movement between the barrel and the slide, an upwardly facing shoulder in fixed position on the frame engaging the barrel to always hold the said rear portion thereof in engagement with the first said semicylindrical slide recess surface, and means on the slide and biased for movement upwardly relatively thereto for engaging the barrel to bias the said front portion thereof upwardly into engagement with the second said slide recess surface.

5. The combination in an automatic firearm, of a frame, a slide guided for longitudinal movement along the frame which slide includes a breechblock and has a rearward recoil movement upon firing, the said slide having a downwardly open recess at the front of the breechblock which recess has a semicylindrical surface at the top of the rear portion thereof and which recess has a smaller semicylindrical surface at the front of the said first surface and having a rearwardly facing stop shoulder at the juncture of the said surfaces, a longitudinal reaction spring for opposing the recoil movement of the slide and for then imparting a forward return movement thereto, a longitudinally movable barrel positioned at the front of the breechblock and having a rear portion fitting the first said semicylindrical slide recess surface and having a smaller forward portion fitting the second said semicylindrical slide recess surface, the said barrel during assembly and disassembly being movable upwardly into said recess and downwardly out of said recess and said portions of the barrel after assembly cooperating with the said slide recess surfaces to serve as guides for relative longitudinal rectilinear movement between the barrel and the slide and the said barrel having a portion which engages the frame to limit rearward movement of the barrel with respect to the frame and said barrel having a forwardly facing shoulder at the juncture of the larger and smaller portions thereof for engaging the said rearwardly facing shoulder on the slide to limit rearward movement of the slide with respect to the barrel, an upwardly facing shoulder in fixed position on the frame engaging the barrel to always hold the said rear portion thereof in engagement with the first said semicylindrical slide recess surface, and means on the slide and biased for movement upwardly relatively thereto for engaging the barrel to bias the said front portion thereof upwardly into engagement with the second said slide recess surface.

6. The combination in an automatic firearm, of a frame, a slide guided for rectilinear longitudinal movement along the frame which slide includes a breechblock and has a rearward recoil movement upon firing, a longitudinal reaction spring for opposing the recoil movement of the slide and for then imparting a forward return movement thereto, a longitudinally movable barrel at the front of the breechblock and having its rear portion engaging the slide and guided for rectilinear longitudinal movement relatively to said slide, the said barrel having a depending lug near its rear end, a forwardly facing shoulder in fixed position on the frame for engaging the barrel lug to limit rearward movement of the barrel, a removable transverse pin in normally fixed position on the frame for engaging the barrel lug to limit forward movement of the barrel, means on the slide for rectilinearly guiding the front portion of the barrel to permit the said relative longitudinal movement between the barrel and the slide, and spring means additional to said reaction spring for normally holding the barrel in its forward position.

7. The combination in an automatic firearm, of a frame, a slide guided for rectilinear longitudinal movement along the frame which slide includes a breechblock and has a rearward recoil movement upon firing, a longitudinally movable barrel at the front of the breechblock and having a depending lug near its rear end, a forwardly facing shoulder on the frame for engaging the barrel lug to limit rearward movement of the barrel, a removable transverse pin in normally fixed position on the frame for engaging the barrel lug to limit forward movement of the barrel, a longitudinal reaction spring connected at the front thereof for opposing the recoil movement of the slide and for then imparting a forward return movement thereto, means connected with the reaction spring at the rear thereof and detachably abutting against the said transverse pin for holding the rear end of said spring in fixed position, and spring means additional to said reaction spring for normally holding the barrel in its forward position as determined by said pin.

8. An automatic firearm as set forth in claim 7, wherein the means connected with the spring at the rear thereof includes a head having a lip which is slightly spaced from the barrel lug when the transverse pin is in place and which is movable to engage the said barrel lug when the said pin is removed.

9. The combination in an automatic firearm, of a frame, a barrel movable longitudinally and rectilinearly relatively to the frame, a slide guided for longitudinal and rectilinear movement along the frame independently of the barrel and including a breechblock at the rear of the barrel which slide has a rearward recoil movement upon firing, said slide being free from any positive engagement with the barrel that would cause said slide to move said barrel rearwardly, and frictional means operable during rearward movement of the slide for moving the barrel rearwardly in unison with the slide.

10. The combination in an automatic firearm, of a frame, a barrel movable longitudinally and rectilinearly relatively to the frame, a slide guided for longitudinal and rectilinear movement along the frame independently of the barrel and including a breechblock at the rear of the barrel which slide has a rearward recoil movement upon firing, said slide being free from any positive engagement with the barrel that would cause said slide to move said barrel rearwardly, frictional means operable during rearward movement of the slide for moving the barrel rearwardly in unison with the slide, and means for limiting the rearward movement of the barrel while permitting continued recoil movement of the slide.

11. The combination in an automatic firearm, of a frame, a barrel movable longitudinally and rectilinearly relatively to the frame and having a rearward recoil movement upon firing, a slide guided for longitudinal and rectilinear movement along the frame independently of the barrel and including a breechblock at the rear of the barrel which slide has a rearward recoil movement upon firing, said slide being free from any positive engagement with the barrel that would cause said slide to move said barrel rearwardly, means for limiting the rearward movement of the barrel while permitting continued rearward movement of the slide, and frictional means engaging the barrel during rearward movement of the slide for first moving the barrel rearwardly in unison with the slide and for then braking the continued rearward movement of the slide.

12. The combination in an automatic firearm, of a frame, a barrel, a slide guided for longitudinal movement along the frame independently of the barrel and including a breechblock at the rear of the barrel which slide has a rearward recoil movement upon firing, the said barrel and the said slide having interengaging longitudinal surfaces at the top of the barrel and near the forward end thereof for guiding relative longitudinal movement, a longitudinal reaction spring connected with the frame independently of and below the barrel for opposing the recoil movement of the slide and for then imparting a forward return movement thereto, and generally upwardly biased frictional means movable with the slide and engaging the barrel at the bottom thereof and below the said interengaging surfaces which means serves to bias one of the said interengaging surfaces toward the other and additionally serves to brake the recoil movement of the slide and also to brake the return movement of the slide.

13. The combination in an automatic firearm, of a frame, a barrel, a slide guided for longitudinal movement along the frame independently of the barrel and including a breechblock at the rear of the barrel which slide has a rearward recoil movement upon firing, the said barrel and the said slide having interengaging longitudinal surfaces at the top of the barrel and near the forward end thereof for guiding relative longitudinal movement, a longitudinal reaction spring connected with the frame independently of and below the barrel for opposing the recoil movement of the slide and for then imparting a forward return movement thereto, generally upwardly biased frictional means movable with the slide and engaging the barrel at the bottom thereof and below the said interengaging surfaces which means serves to bias one of the said interengaging surfaces toward the other and additionally serves to brake the recoil movement of the slide and also to brake the return movement of the slide, and means for causing the braking action during the return movement of the slide to be less than the braking action during the recoil movement thereof.

14. The combination in an automatic firearm, of a frame, a barrel having longitudinal movement with respect to the frame, means for narrowly limiting the longitudinal movement of the barrel in both directions, a slide guided for longitudinal movement along the frame independently of the barrel and including a breechblock at the rear of the barrel which slide has a rearward recoil movement upon firing substantially greater than the limited longitudinal movement of the barrel, a longitudinal reaction spring for opposing the recoil movement of the slide and for then imparting a forward return movement thereto, and frictional means movable with the slide and engaging the barrel which means serves during recoil movement of the slide to first move the barrel rearwardly and to thereafter brake the continued recoil movement of the slide and which means serves during return movement of the slide to first move the barrel forwardly and to thereafter brake the continued return movement of the slide.

15. The combination in an automatic firearm, of a frame, a barrel, a slide guided for longitudinal movement along the frame independently of the barrel and including a breechblock at the rear of the barrel which slide has a rearward recoil movement upon firing, the said barrel and the said slide having interengaging longitudinal surfaces at the top of the barrel and near the forward end thereof for guiding relative longitudinal movement, a longitudinal reaction spring connected with the frame independently of and below the barrel for opposing the recoil movement of the slide and for then imparting a forward return movement thereto, frictional means movable with the slide and engaging the barrel at the bottom thereof and below said interengaging surfaces, and means connected with the forward end of the reaction spring for causing the frictional means to bias the forward portion of the barrel upwardly and for additionally causing the said frictional means to operate for braking the said recoil movement of the slide and to thereafter operate for braking the said return movement of the slide.

16. The combination in an automatic firearm, of a frame, a barrel, a slide guided for longitudinal movement along the frame independently of the barrel and including a breechblock at the rear of the barrel which slide has a rearward recoil movement upon firing, the said barrel and the said slide having interengaging longitudinal surfaces at the top of the barrel and near the forward end thereof for guiding relative longitudinal movement, a longitudinal reaction spring connected with the frame independently of and below the barrel for opposing the recoil movement of the slide and for then imparting a forward return movement thereto, and a friction block engageable with the bottom of the barrel below said interengaging surfaces and bodily movable with the slide, the said block being also movable to a small extent relatively to the slide and being engaged by the reaction spring so as to be biased for relative movement in one direction and the said block having means which engage the slide and which serve by reason of the bias in the last said direction to cause the block to move upwardly and to frictionally engage the barrel.

17. The combination in an automatic firearm, of a frame, a barrel, a slide guided for longitudinal movement along the frame independently of the barrel and including a breechblock at the rear of the barrel which slide has a rearward recoil movement upon firing, a longitudinal reaction spring for opposing the recoil movement of the slide and for then imparting a forward return movement thereto, and a friction block engageable with the barrel and having forwardly and upwardly inclined ribs entered in similarly shaped and similarly inclined grooves in the slide, the said block being movable to a small extent relatively to the slide in the direction of the ribs and being engaged by the reaction spring so as to be biased for relative forward and upward movement so as to frictionally engage the barrel.

18. The combination in an automatic firearm, of a frame, a barrel, a breech slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly a firing pin longitudinally movable in the breechblock, a spring carried by the breechblock for moving the firing pin forwardly for firing, a sear carried by the breechblock and normally engaging the firing pin to restrain forward movement thereof, a trigger, means on the frame connecting the trigger with the sear for enabling the trigger to move the sear so as to release the firing pin for forward firing movement by the said spring, and a longitudinally movable safety block on the frame having a normal safety position in which it is in the path of sear movement to prevent the sear from releasing the firing pin and having another position in which it is out of the path of sear movement.

19. The combination in an automatic firearm, of a frame having a grip portion, a barrel, a breech slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a firing pin longitudinally movable in the breechblock, a spring carried by the breechblock for moving the firing pin forwardly for firing, a sear carried by the breechblock and located below the firing pin and normally engaging it to restrain forward movement thereof, a portion of the sear being movable downwardly for disengaging the firing pin, a trigger, means on the frame connecting the trigger with the sear for enabling the trigger to move the said portion of the sear downwardly so as to release the firing pin for forward firing movement by the said spring, and a longitudinally movable safety block on the frame having a safety position in which it is below the said portion of the sear and in the path of downward movement thereof to prevent the sear from releasing the firing pin and having another position in which it is out of the path.

20. The combination in an automatic firearm, of a frame, a barrel, a breech slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a firing pin longitudinally movable in the breechblock, a spring carried by the breechblock for moving the firing pin forwardly for firing, a sear carried by the breechblock and normally engaging the firing pin to restrain forward movement thereof, a trigger, means on the frame connecting the trigger with the sear for enabling the trigger to move the sear so as to release the firing pin for forward firing movement by the said spring, a longitudinally movable safety block on the frame having a safety position in which it is in the path of sear movement to prevent the sear from releasing the firing pin and having another position in which it is out of the path of sear movement, and a safety locking pin engageable with the frame and movable into and out of the position in which it engages the safety block to lock it in its said safety position.

21. The combination in an automatic pistol, of a frame having a grip portion, a barrel, a breech slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a firing pin longitudinally movable in the breechblock, a spring carried by the breechblock for moving the firing pin forwardly for firing, a sear carried by the breechblock and normally engaging the firing pin to restrain forward movement thereof, a trigger at the front of the grip portion of the frame, means on the frame connecting the trigger with the sear for enabling the trigger to move the sear so as to release the firing pin for forward firing movement by the said spring, a longitudinally movable safety block on the frame having a safety position in which it is in the path of sear movement to prevent the sear from releasing the firing pin and having another position in which it is out of the path of sear movement, spring means for biasing the safety block for movement to its said safety position, and a removable safety locking pin serving when in place to engage the safety block and lock it in its said safety position.

22. The combination in an automatic firearm and a holder therefor, of a frame having spaced first and second transverse holes therein near the rear, a barrel, a slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a firing pin longitudinally movable in the breechblock, a spring for moving the firing pin forwardly for firing, a sear normally engaging the firing pin to restrain forward movement thereof, a trigger, means connecting the trigger with the sear for enabling the trigger to move the sear so as to release the firing pin for forward firing movement by the said spring, a longitudinally movable safety block having a safety position in which it is in the path of sear movement to prevent the sear from releasing the firing pin and having another position in which it is out of the path of sear movement, the said safety block being so movable that in its safety position it is out of register with the first transverse hole in the frame and being so movable that in its said other position it obstructs the said first hole, and a holder for the firearm having first and second transverse pins of such size and so spaced as to respectively enter and fit the said first and second holes in the frame, said first pin when entered in the said first hole serving to engage the safety block to lock it in its said safety position.

23. An automatic firearm and a holder therefor as set forth in claim 22, wherein the lower pin of the holder is provided with a latch which is movable through the lower hole in the frame and which is engageable with the side face of the frame for retaining the holder in assembled relationship with the pistol.

24. The combination in an automatic pistol, of a frame, a barrel, a slide guided for longitudinal movement along the frame independently of the barrel and including a breechblock at the rear of the barrel which slide has a rearward recoil movement upon firing, the breechblock having a downwardly open recess therein including longitudinal firing pin guideway, a longitudinal reaction spring for opposing the recoil movement of the slide and for then moving it forwardly, a firing pin longitudinally movable in the guideway in the breechblock and having a forwardly facing shoulder at its bottom, a sear normally located chiefly below the firing pin and having a rearwardly facing shoulder on the front portion thereof and normally engaging the firing pin shoulder to retain the said firing pin, the said sear having an upward extension at the rear which is behind the firing pin, a compression spring between the firing pin and the sear extension which biases the firing pin forwardly with respect to the sear and which biases the sear for a tilting movement in the direction to move the front portion thereof upwardly, and means connecting the trigger with the sear for enabling the trigger to tilt the sear in the direction to move the front portion thereof downwardly in opposition to the said bias so as to release the firing pin for forward firing movement by the said spring.

25. The combination in an automatic pistol, of a frame, a barrel, a slide guided for longitudinal movement along the frame independently of the barrel and including a breechblock at the rear of the barrel which slide has a rearward recoil movement upon firing, the breechblock having a downwardly open recess therein including longitudinal firing pin guideway, an openable cover on the slide normally closing the said recess at the rear thereof, a longitudinal reaction spring for opposing the recoil movement of the slide and for then moving it forwardly, a firing pin longitudinally movable in the guideway in the breechblock and having a forwardly facing shoulder at its bottom, a sear normally located chiefly below the firing pin and having a rearwardly facing shoulder on the front portion thereof and normally engaging the firing pin shoulder to retain the said firing pin, the said sear having an upward extension at the rear which is behind the firing pin, a compression spring between the firing pin and the sear extension which biases the firing pin forwardly with respect to the sear and which biases the sear for a tilting movement in the direction to move the front portion thereof upwardly, means connected with the sear and engaging the slide cover when the slide is in forward position which means prevents rearward movement of the sear and firing pin, a trigger, and means connecting the trigger with the sear for enabling the trigger to tilt the sear in the direction to move the front portion thereof downwardly in opposition to the said bias so as to release the firing pin for forward firing movement by the said spring.

26. An automatic pistol as set forth in claim 25, wherein the said shoulders on the firing pin and on the sear cooperate with the said spring to normally hold the firing pin and sear in fixed relationship with each other so that they can be removed or inserted as a unit when the said cover is open.

27. The combination in an automatic pistol, of a frame, a barrel, a slide guided for longitudinal movement along the frame independently of the barrel and including a breechblock at the rear of the barrel which slide has a rearward recoil movement upon firing, the breechblock having a downwardly open recess therein including longitudinal firing pin guideway, a longitudinal reaction spring for opposing the recoil movement of the slide and for then moving it forwardly, a firing pin longitudinally movable in the guideway in the breechblock and having a forwardly facing shoulder at its bottom, a sear normally located chiefly below the firing pin and having a rearwardly facing shoulder on the front portion thereof and normally engaging the firing pin shoulder to retain the said firing pin, the said sear having an upward extension at the rear which is behind the firing pin and the said sear having a downward extension at the front, a compression spring between the firing pin and the upward sear extension which biases the firing pin forwardly with respect to the sear and which biases the sear for a tilting movement in the direction to move the front portion thereof upwardly, a trigger, means connecting the trigger with the sear for enabling the trigger to tilt the sear in the direction to move the front portion thereof downwardly in opposition to the said bias so as to release the firing pin for forward firing movement by the said spring, and a cocking block on the frame located with its upper face substantially at the level of the bottom of the downward extension of the sear when the sear is in retaining engagement with the firing pin which block is further so located that upon tilting of the sear to release the firing pin the said downward extension of the sear is at the front of the block, the said cocking block serving during rearward recoil movement to engage the said downward extension of the sear to prevent rearward movement of the sear until the firing pin has moved rearwardly sufficiently to permit the spring to tilt the sear in the direction to move the sear shoulder into cocked engagement with the firing pin shoulder so that the said downward sear extension then moves rearwardly over the upper face of the block.

28. An automatic pistol as set forth in claim 27, wherein the cocking block is biased for forward movement and moves forwardly after effecting cocking so that it is below the forward sear extension and holds the sear in its cocked relationship with the firing pin when the said sear and firing pin are in their forward positions.

29. The combination in an automatic pistol, of a frame having a grip portion, a barrel, a slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a trigger at the front of the grip portion of the frame, a firing pin carried by the breechblock and biased to move forwardly for firing, a movable sear normally engaging the firing pin to hold it in its rear position, means for connecting the trigger with the sear to enable the trigger to move the sear for releasing the firing pin, a safety block biased to a forward safety position in which it obstructs pin releasing movement of the sear, a grip safety member at the front of the grip portion of the frame and below the trigger which grip safety member is movable rearwardly and forwardly and is biased forwardly, and means operable upon rearward movement of the grip safety member for moving the safety block rearwardly out of its safety sear obstructing position.

30. The combination in an automatic pistol, of a frame having a grip portion, a barrel, a slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a grip safety member mounted on the grip portion of the frame at the front thereof which member is movable rearwardly and forwardly and is biased forwardly, a trigger mounted on and bodily movable with the grip safety member to rearward and forward positions, and sear mechanism on the frame and slide including an operating element connected with the sear to move it for effecting firing, said trigger on the grip safety member upon relative trigger movement being operatively engageable with said operating element for the sear when the grip safety member and the trigger are in their rearward positions and said trigger being out of engaging relationship with said operating element for the sear when the grip safety member and trigger are in their forward positions.

31. The combination in an automatic pistol, of a frame having a grip portion, a barrel, a slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a grip safety member mounted on the grip portion of the frame at the front thereof which member is movable rearwardly and forwardly and is biased forwardly, a trigger mounted on and bodily movable with the grip safety member to rearward and forward positions, a firing pin carried by the breechblock and biased to move forwardly for firing, a relatively movable sear normally engaging the firing pin to hold it in its rear position, and means for connecting the trigger with the sear to enable the trigger to move the sear for releasing the firing pin, the last said means including an operating element with which the trigger is operatively engageable when the grip safety member and the trigger are in their rearward positions and with which the trigger is out of engaging relationship when the grip safety member and the trigger are in their forward positions.

32. The combination in an automatic pistol, of a frame having a grip portion, a barrel, a slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a firing pin carried by the breechblock and biased to move forwardly for firing, a movable sear normally engaging the firing pin to hold it in its rear position, a connector pivotally connected with the frame and engaging at its rear with the sear for moving it to release the firing pin, a grip safety member at the front of the grip portion of the frame which member is movable rearwardly and forwardly and is biased forwardly, a trigger bodily movable with the grip safety member to rearward and forward positions and also movable relatively to the said member into and out of a firing position and is biased forwardly out of the said firing position, and a trigger arm connected to and movable with the trigger, and the said trigger arm when in its rearward position and upon relative movement of the said trigger to its firing position being engageable with a forward portion of the connector to pivotally move it for effecting pin releasing movement of the sear and the said trigger arm when it and the trigger are in their forward positions being out of engaging relationship with the connector.

33. The combination in an automatic pistol, of a frame having a grip portion, a barrel, a slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a firing pin carried by the breechblock and biased to move forwardly for firing, a movable sear normally engaging the firing pin to hold it in its rear position, a connector pivotally connected with the frame and also longitudinally movable relatively thereto to rearward and forward positions and biased forwardly, the said connector in its forward position engaging at its rear with the sear and serving upon pivotal movement to move the sear for releasing the firing pin, a grip safety member at the front of the grip portion of the frame which member is movable rearwardly and forwardly and is biased forwardly, a trigger bodily movable with the grip safety member to rearward and forward positions which trigger is also movable relatively to the said member into and out of a firing position and is biased forwardly out of the said firing position, and a trigger arm connected to and movable with the trigger and located at the front of a portion of the connector when the trigger is in its forward position and is in its relative firing position so that upon rearward movement of the trigger and arm while retained in their relative firing positions the arm moves the connector rearwardly in opposition to its bias, the said trigger arm being also so located that upon movement of the trigger and arm out of their relative firing positions while retained in their rearward positions the connector moves forwardly by reason of its bias with the result that a forward portion of the connector is positioned to be engaged and pivotally moved by the trigger arm upon a subsequent movement of the trigger to its relative firing position.

34. The combination in an automatic pistol, of a frame having a grip portion, a barrel, a slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, a grip safety member at the front of the grip portion of the frame which member is movable rearwardly and forwardly and is biased forwardly, a firing pin carried by the breechblock and biased to move forwardly for firing, a movable sear normally engaging the firing pin to hold it in its rear position, a safety block biased to a forward position in which it obstructs pin releasing movement of the sear, means operable upon rearward movement of the grip safety member for moving the safety block rearwardly out of its sear obstructing position, a trigger carried by and bodily movable with the grip safety member to rearward and forward positions, and means for connecting the trigger with the sear to enable the trigger to move the sear for releasing the firing pin, the last said means being operable when the grip safety member and the trigger are in their rear positions and inoperable when the grip safety member and the sear are in their forward positions.

35. The combination in an automatic pistol of a frame, a longitudinal barrel on said frame, a breech slide guided on said frame for rectilinear longitudinal movement and having a rearward recoil movement upon firing, a longitudinal reaction spring for opposing the rearward recoil movement of the slide and for then moving it forwardly, a retractor longitudinally guided on said frame for relative rectilinear reciprocable movement and biased forwardly, manually operable means on said frame for moving the retractor rearwardly, a releasable latch connecting the retractor with the slide and bodily movable rectilinearly with them which latch enables said retractor to move the slide rearwardly in opposition to the reaction spring, and means for automatically releasing the latch upon rearward movement of the retractor to a predetermined extent so as to enable the longitudinal reaction spring to move the slide forwardly independently of the retractor.

36. The combination in an automatic pistol of a frame, a longitudinal barrel on said frame, a breech slide guided on said frame for rectilinear longitudinal movement and having a rearward recoil movement upon firing, a longitudinal reaction spring for opposing the rearward recoil movement of the slide and for then moving it forwardly, a retractor longitudinally guided on said frame for relative rectilinear reciprocable movement and biased forwardly, manually operable means on said frame for moving the retractor rearwardly, a means with which the slide is longitudinally movable in unison which means has a notch adjacent the retractor, a releasable latch carried by the retractor and rectilinearly movable therewith which latch is engageable in the said notch to enable the said retractor to move the slide rearwardly in opposition to the reaction spring, and means for automatically disengaging the latch from the notch upon rearward movement of the retractor to a predetermined extent so as to enable the longitudinal reaction spring to move the slide forwardly independently of the retractor.

37. An automatic pistol as set forth in claim 36, wherein the latch has a tail which is engageable with a stationary portion of the frame and is thereby moved to release the slide upon movement to the said predetermined extent.

38. The combination in an automatic firearm, of a frame, a barrel longitudinally movable relatively to the frame and biased forwardly, a slide guided for longitudinal movement along the frame independently of the barrel and including a breechblock at the rear of the barrel which slide has a rearward recoil movement upon firing, a longitudinal reaction spring for opposing the rearward recoil movement of the slide and for then imparting a forward return movement thereto, frictional means operable during rearward recoil movement of the slide for moving the barrel rearwardly in unison with the slide, means for limiting the rearward movement of the barrel while permitting continued rearward movement of the slide, a retractor longitudinally reciprocable relatively to the frame and biased forwardly, manually operable means for moving the retractor rearwardly, a releasable latch connecting the retractor with the slide to enable the said retractor to move the slide rearwardly in opposition to the reaction spring, means for automatically releasing the latch upon rearward movement of the retractor to a predetermined extent so as to enable the reaction spring to then move the slide forwardly independently of the retractor, and means for causing the said frictional means to be inoperative during rearward movement of the slide by the retractor so that the barrel then remains in its forward position.

39. The combination in an automatic firearm, of a frame, a barrel longitudinally movable relatively to the frame and biased forwardly, a slide guided for longitudinal movement along the frame independently of the barrel and including a breechblock at the rear of the barrel which slide has a rearward recoil movement upon firing, a longitudinal reaction spring for opposing the rearward recoil movement of the slide and for then imparting a forward return movement thereto, means for limiting rearward movement of the barrel while permitting continued rearward movement of the slide, frictional means engaging the barrel during rearward recoil movement of the slide for first moving the barrel rearwardly in unison with the slide and for then braking the continued rearward movement of the slide, a retractor longitudinally reciprocable relatively to the frame and biased forwardly, manually operable means for moving the retractor rearwardly, a releasable latch connecting the retractor with the slide to enable the said retractor to move the slide rearwardly in opposition to the reaction spring, means for automatically releasing the latch upon rearward movement of the retractor to a predetermined extent so as to enable the reaction spring to then move the slide forwardly independently of the retractor, and means for causing the said frictional means to be inoperative during rearward movement of the slide by the retractor.

40. The combination in an automatic firearm, of a frame, a barrel, a breech slide guided for longitudinal movement along the frame and having a rearward recoil movement upon firing, a longitudinal reaction spring for opposing the rearward recoil movement of the slide and for then imparting a forward return movement thereto, frictional means operable for braking the said rearward movement of the slide as the result of recoil, a retractor longitudinally reciprocable relatively to the frame and biased forwardly, manually operable means for moving the retractor rearwardly, a releasable latch connecting the retractor with the slide to enable the said retractor to move the slide rearwardly in opposition to the reaction spring, means for automatically releasing the latch upon rearward movement of the retractor to a predetermined extent so as to enable the reaction spring to then move the slide forwardly independently of the retractor, and means for causing the said braking means to be inoperative during rearward movement of the slide by the retractor.

41. The combination in an automatic firearm, of a frame, a barrel, a breech slide guided for longitudinal movement along the frame and having a rearward recoil movement upon firing, a longitudinal reaction spring for opposing the rearward recoil movement of the slide and for then imparting a forward return movement thereto, frictional means operable for braking the said rearward movement of the slide as the result of recoil and thereafter operable for braking the said return movement of the slide, a retractor longitudinally reciprocable relatively to the frame and biased forwardly, manually operable means for moving the retractor rearwardly, a releasable latch connecting the retractor with the slide to enable the said retractor to move the slide rearwardly in opposition to the reaction spring, means for automatically releasing the latch upon rearward movement of the retractor to a predetermined extent so as to enable the reaction spring to then move the slide forwardly independently of the retractor, and means for causing the said braking means to be inoperative during rearward movement of the main slide by the retractor while remaining operative during return movement of the slide by the reaction spring.

42. The combination in an automatic firearm, of a frame, a barrel longitudinally movable relatively to the frame, a slide guided for longitudinal movement along the frame independently of the barrel and including a breechblock at the rear of the barrel which slide has a rearward recoil movement upon firing, a longitudinal reaction spring for opposing the rearward recoil movement of the slide and for then imparting a forward return movement thereto, a friction block engageable with the barrel and bodily movable with the slide which block is also guided for movement relatively to the slide in a forward and upward direction or in a rearward and downward direction, the said block being engaged by the reaction spring so as to be normally biased for relative forward and upward movement into frictional engagement with the barrel, and means for moving the friction block in opposition to the reaction spring, the said block first moving rearwardly and downwardly out of engagement with the barrel and then moving rearwardly and serving to so move the slide rearwardly.

43. The combination in an automatic firearm, of a frame, a barrel longitudinally movable relatively to the frame, a slide guided for longitudinal movement along the frame independently of the barrel and including a breechlock at the rear of the barrel which slide has a rearward recoil movement upon firing, a longitudinal reaction spring for opposing the rearward recoil movement of the slide and for then imparting a forward return movement thereto, a friction block engageable with the barrel and bodily movable with the slide which block is also guided for movement relatively to the slide in a forward and upward direction or in a rearward and downward direction, the said block being engaged by the reaction spring so as to be normally biased for relative forward and upward movement into frictional engagement with the barrel, a retractor longitudinally reciprocable relatively to the frame and biased forwardly, manually operable means for moving the retractor rearwardly, a releasable latch connecting the friction block with the retractor and serving upon rearward movement thereof to move the block in opposition to the reaction spring, the said block first moving rearwardly and downwardly out of engagement with the barrel and then moving rearwardly and serving to move the slide rearwardly, and means for automatically releasing the latch upon rearward movement of the retractor to a predetermined extent so as to enable the reaction spring to move the friction block and the slide forwardly independently of the retractor.

44. The combination in an automatic firearm, of a frame, a barrel longitudinally movable relatively to the frame, a slide guided for longitudinal movement along the frame independently of the barrel and including a breechblock at the rear of the barrel which slide has a rearward recoil movement upon firing, a longitudinal reaction spring for opposing the rearward recoil movement of the slide and for then imparting a forward return movement thereto, a friction block engageable with the barrel and bodily movable with the slide which block is also guided for movement relatively to the slide in a forward and upward direction or in a rearward and downward direction, the said block being engaged by the reaction spring so as to be normally biased for relative forward and upward movement into frictional engagement with the barrel and the said block having a notch in the bottom thereof, a retractor below the frictional block and limiting relative rearward and downward movement thereof which retractor is longitudinally reciprocable relatively to the frame and is biased forwardly, manually operable means for moving the retractor rearwardly, a releasable latch on the retractor engaging the notch in the block and serving upon rearward movement of the said retractor to move the block in opposition to the reaction spring, the said block first moving rearwardly and downwardly out of engagement with the barrel and then moving rearwardly and serving to move the slide rearwardly, and means for automatically disengaging the latch from the friction block upon rearward movement of the retractor to a predetermined extent so as to enable the reaction spring to move the said block and the slide forwardly independently of the retractor.

45. The combination in an automatic pistol of a frame, a barrel, a breech slide guided for longitudinal movement along the frame and having a rearward recoil movement upon firing, a longitudinal reaction spring for opposing the rearward recoil movement of the slide and for then returning it to a forward position, a retractor longitudinally reciprocable relatively to the frame and biased to a forward position, manually operable means for effecting a relative rearward movement of the retractor and for effecting a second similar movement of the said retractor after it has been permitted to be moved to its forward position, means releasably connecting the retractor with the slide to enable the said retractor during the first rearward movement thereof to move the slide rearwardly from its forward position to an intermediate position, automatically acting means for retaining the slide in the said intermediate position, means releasably connecting the retractor with the slide to enable the said retractor during the second rearward movement thereof to additionally move the slide rearwardly from the said intermediate position, means for automatically releasing the said connecting means upon the second rearward movement of the retractor to a predetermined extent so as to enable the reaction spring to then effect forward movement of the slide to its forward position independently of the retractor, and means for causing the automatically acting slide retaining means to be inoperative during the last said forward movement of the slide.

46. The combination in an automatic pistol of a frame, a barrel, a breech slide guided for longitudinal movement along the frame and having a rearward recoil movement upon firing, a longitudinal reaction spring for opposing the rearward recoil movement of the slide and for then returning it to a forward position, automatically acting means for retaining the slide in an intermediate position between its forward position and its rearward position, a retractor longitudinally reciprocable relatively to the frame and biased to a forward position, manually operable means for effecting a relative rearward movement of the retractor and for effecting a second similar movement of the said retractor after it has been permitted to be moved to its forward position, a means with which the slide is longitudinally movable in unison which means has rearward and forward notches adjacent the retractor, a releasable latch carried by the retractor and engageable in the said rearward notch during the first rearward movement of the retractor to enable the retractor to move the slide rearwardly from its forward position to its said intermediate position, the said latch being engageable in the said forward notch during the second rearward movement of the retractor to enable the retractor to move the slide rearwardly from its said intermediate position, means for automatically disengaging the latch from the forward notch upon the second rearward movement of the retractor to a predetermined extent so as to enable the reaction spring to then effect forward movement of the slide to its forward position independently of the retractor, and means for causing the automatically acting slide retaining means to be inoperative during the last said forward movement of the slide.

47. An automatic pistol as set forth in claim 46, wherein the means longitudinally movable in unison with the slide has a third notch, wherein a pivoted latch is provided on the frame for entering the said notch to hold the said means and the slide in the said intermediate position, and wherein the said longitudinally movable means carries a pin longitudinally movable relatively thereto and adjacent the third notch therein, the said pin being engaged by the last said latch during forward movement of the said means and slide from their rearward positions so as to be moved relatively rearwardly and so as to prevent the latch from entering the notch.

48. The combination in an automatic pistol, of a frame having a grip portion, a longitudinal barrel on said frame, a breech slide guided on said frame for rectilinear longitudinal movement and having a rearward recoil movement upon firing, a longitudinal reaction spring for opposing the recoil movement of the slide and for then moving it forwardly, a forwardly and rearwardly movable grip member adjacent the grip portion of the frame and constructed and arranged to be moved rearwardly by the hand of a user engaged with the said grip portion, a retractor guided for rectilinear longitudinal movement along the frame and below the slide and connected with the grip member for movement in unison therewith, means for biasing the grip member and the retractor forwardly, means for releasably connecting the said retractor with the slide and bodily movable rectilinearly with them which means serves upon rearward movement of the said grip member and retractor to move the slide rearwardly in unison therewith and in opposition to the reaction spring, and means for automatically releasing the said connecting means upon rearward movement of the grip member and the retractor to a predetermined extent so as to enable the longitudinal reaction spring to move the slide forwardly independently of the grip member and the retractor.

49. The combination in an automatic pistol, of a frame having a grip portion, a barrel, a breech slide guided for longitudinal movement along the frame and having a rearward recoil movement upon firing, a longitudinal reaction spring for opposing the recoil movement of the slide and for then moving it forwardly, a forwardly and rearwardly movable grip member adjacent the grip portion of the frame and constructed and arranged to be moved rearwardly by the hand of a user engaged with the said grip portion, a retractor guided for longitudinal movement along the frame and below the slide and connected with the grip member for movement therewith, means for biasing the grip member and the retractor forwardly, a means with which the slide is longitudinally movable in unison which means has a notch in the bottom thereof, a releasable latch carried by the said retractor and engageable in the said notch to enable the said grip member and the said retractor to move the slide rearwardly and in opposition to the reaction spring, and means for automatically disengaging the said latch flom the notch upon rearward movement of the grip member and the retractor to a predetermined extent so as to enable the reaction spring to move the slide forwardly independently of the grip member and the retractor.

50. The combination in an automatic pistol, of a frame having a grip portion, a barrel longitudinally movable relatively to the frame and biased forwardly, a slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, frictional means operable during rearward recoil movement of the slide for moving the barrel rearwardly with the slide, a forwardly and rearwardly movable grip member adjacent the grip portion of the frame and constructed and arranged to be moved rearwardly by the hand of a user engaged with the said grip portion, means for biasing the grip member forwardly, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined extent so as to enable the reaction spring to move the slide forwardly independently of the grip member, and means for causing the frictional means to be inoperative during rearward movement of the slide by the grip member so that the barrel remains in its forward position.

51. The combination in an automatic pistol, of a frame having a grip portion, a barrel, a slide guided for longitudinal movement along the frame and including a breechblock at the rear of the barrel which slide has a rearward recoil movement upon firing, a longitudinal reaction spring for opposing the recoil movement of the slide and for then moving it forwardly, frictional means for braking the rearward movement of the slide as the result of recoil, a forwardly and rearwardly movable grip member adjacent the grip portion of the frame and constructed and arranged to be moved rearwardly by the hand of a user engaged with the said grip portion, means for biasing the grip member forwardly, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined extent so as to enable the reaction spring to move the slide forwardly independently of the grip member, and means for causing the frictional means to be inoperative during rearward movement of the slide by the grip member.

52. The combination in an automatic pistol of a frame, a barrel, a breech slide guided for longitudinal movement along the frame and having a rearward recoil movement upon firing, a longitudinal reaction spring for opposing the rearward recoil movement of the slide and for then returning it to a forward position, a retractor longitudinally reciprocable relatively to the frame and biased to a forward position, a longitudinally reciprocable grip member adjacent the grip portion of the frame and constructed and arranged to be moved rearwardly by the hand of a user engaged with the grip portion, the said grip member being connected with the retractor and serving to effect a relative rearward movement of the retractor and to effect a second similar movement of the said retractor after it and the grip member have been permitted to be moved to their forward positions, means releasably connecting the retractor with the slide to enable the said retractor and grip member during the first rearward movement thereof to move the slide rearwardly from its forward position to an intermediate position, automatically acting means for retaining the slide in the said intermediate position, means releasably connecting the retractor with the slide to enable the said retractor during the second rearward movement of the said retractor and grip member to additionally move the slide rearwardly from the said intermediate position, means for automatically releasing the said connecting means upon the second rearward movement of the retractor and grip member to a predetermined extent so as to enable the reaction spring to then effect forward movement of the slide to its forward position independently of the retractor and grip member, and means for causing the automatically acting slide retaining means to be inoperative during the last said forward movement of the slide.

53. The combination in an automatic pistol, of a frame having a hollow grip portion, a barrel, a slide guided for longitudinal movement along the frame and including a breechblock at the rear of the barrel which slide has a rearward recoil movement upon firing, a longitudinal reaction spring for opposing the recoil movement of the slide and for then moving it forwardly, a magazine in the hollow grip member for presenting successive cartridges to a position from which they can be moved by the breechblock forwardly into the barrel, a forwardly and rearwardly movable grip member adjacent the grip portion of the frame and constructed and positioned to be moved rearwardly by the hand of a user engaged with the said grip portion, means for biasing the grip member to a forward position, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined extent so as to enable the reaction spring to move the slide forwardly independently of the grip member, and a releasable latch for retaining the magazine in position in the hollow grip member which latch has a finger piece movable to cause the latch to release the magazine, the finger piece of the latch being positioned to be accessible by a finger of the user when the grip member is in its said forward position and inaccessible when the grip member is in its rearward position.

54. The combination in an automatic pistol, of a frame having a grip portion, a barrel, a breech slide longitudinally movable along the frame and having a rearward recoil movement upon firing, a longitudinal reaction spring for opposing the rearward recoil movement of the slide and for then moving it forwardly, firing mechanism carried by the frame and the slide, a forwardly and rearwardly movable grip member adjacent the grip portion of the frame and constructed and arranged to be moved rearwardly by the hand of a user engaged with the said grip portion, means for biasing the grip member forwardly, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined extent so as to enable the reaction spring to move the slide forwardly independently of the grip member, a trigger bodily movable forwardly and rearwardly with the grip member, and means enabling the trigger to actuate the said firing mechanism which means is operable when the trigger is in its bodily rearward position and which means is otherwise inoperable.

55. The combination in an automatic pistol, of a frame having a grip portion, a barrel, a breech slide longitudinally movable along the frame and having a rearward recoil movement upon firing, a longitudinal reaction spring for opposing the rearward recoil movement of the slide and for then moving it forwardly, firing mechanism carried by the frame and slide, a forwardly and rearwardly movable grip member adjacent the grip portion of the frame and constructed and arranged to be moved rearwardly by the hand of a user engaged with the said grip portion, means for biasing the grip member forwardly, a trigger bodily movable forwardly and rearwardly with the grip member and also movable forwardly and rearwardly relatively thereto and biased relatively forwardly, the said trigger being so positioned in relation to the grip member that it is engaged by the index finger of the user and pressed relatively rearwardly when the grip member is moved rearwardly by the said hand of the user, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined extent so as to enable the reaction spring to move the slide forwardly independently of the grip member, and means enabling the trigger to actuate the firing mechanism which means is operable when the grip member and the trigger are in their bodily rearward positions and when the trigger is in its relatively forward position, the said means being inoperable to actuate the firing mechanism when the trigger is moved bodily rearwardly while in its relatively rearward position.

56. The combination in an automatic pistol, of a frame having a grip portion, a barrel, a breech slide longitudinally movable along the frame and having a rearward recoil movement upon firing, a longitudinal reaction spring for opposing the rearward recoil movement of the slide and for then moving it forwardly, firing mechanism carried by the frame and the slide, a forwardly and rearwardly movable grip member adjacent the grip portion of the frame and constructed and arranged to be moved rearwardly by the hand of a user engaged with the said grip portion, means for biasing the grip member forwardly, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined rearward position so as to enable the reaction spring to move the slide forwardly independently of the grip member, a trigger, means enabling the trigger to actuate the firing mechanism which means is operable when the grip member is in its said rearward position, and means for locking the firing mechanism to cause it to be inoperative when the grip member is forward from its said rearward position.

57. The combination in an automatic pistol, of a frame having a grip portion, a barrel, a breech slide longitudinally movable along the frame and having a rearward recoil movement upon firing, a longitudinal reaction spring for opposing the rearward recoil movement of the slide and for then moving it forwardly, firing mechanism carried by the frame and the slide, a forwardly and rearwardly movable grip member adjacent the grip portion of the frame and constructed and arranged to be moved rearwardly by the hand of a user engaged with the said grip portion, means for biasing the grip member forwardly, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined extent so as to enable the reaction spring to move the slide forwardly independently of the grip member, a trigger bodily movable forwardly and rearwardly with the grip member, means enabling the trigger to actuate the said firing mechanism which means is operable when the trigger is in its bodily rearward position and which means is otherwise inoperable, and means for locking the firing mechanism to cause it to be inoperative when the grip member is forward from its said rearward position.

58. The combination in an automatic firearm, of a frame having a grip portion, a barrel, a breech slide guided for longitudinal movement along the frame independently of the barrel and including a breechblock at the rear of the barrel which slide has a rearward recoil movement upon firing, a longitudinal reaction spring for opposing the recoil movement of the slide and for then moving it forwardly, firing mechanism including a firing pin and a sear normally engaging the firing pin to restrain firing movement thereof, a forwardly and rearwardly movable grip member adjacent the grip portion of the frame and constructed and arranged to be moved rearwardly by the hand of a user engaged with the said grip portion, means for biasing the grip member forwardly, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined extent so as to enable the reaction spring to move the slide forwardly independently of the grip member, a trigger bodily movable forwardly and rearwardly with the grip member and also movable relatively thereto, means on the frame connecting the trigger with the sear for enabling the trigger upon relative movement thereof to move the sear so as to release the firing pin which last said means is operable when the trigger is in its bodily rearmost position and is otherwise inoperable, a movable safety block on the frame having a normal safety position in which it is in the path of sear movement to prevent the sear from releasing the firing pin and having another position in which it is out of the path of sear movement, and means dependent on movement of the grip member to its rearmost position for moving said safety block out of its safety position.

59. The combination in an automatic pistol, of a frame having a grip portion, a barrel, a breech slide longitudinally movable along the frame and having a rearward recoil movement upon firing, a longitudinal reaction spring for opposing the rearward recoil movement of the slide and for then moving it forwardly, firing mechanism carried by the frame and the slide, a forwardly and rearwardly movable grip member adjacent the grip portion of the frame and constructed and arranged to be moved rearwardly by the hand of a user engaged with the said grip portion, means for biasing the grip member forwardly, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined rearward position so as to enable the reaction spring to move the slide forwardly independently of the grip member, a trigger, means enabling the trigger to actuate the firing mechanism, and a manually engageable latch for holding the grip member in a position near its said rearward position.

60. An automatic pistol as set forth in claim 59, wherein the latch is on the slide and wherein the latch when disengaged serves on a stop to limit forward movement of the grip member.

61. The combination in an automatic pistol, of a frame having a grip portion, a barrel, a breech slide longitudinally movable along the frame and having a rearward recoil movement upon firing, a longitudinal reaction spring for opposing the rearward recoil movement of the slide and for then moving it forwardly, firing mechanism carried by the frame and the slide, a forwardly and rearwardly movable grip member adjacent the grip portion of the frame and constructed and arranged to be moved rearwardly by the hand of a user engaged with the said grip portion, means for biasing the grip member forwardly, means for releasably connecting the said grip member with the slide and serving upon rearward movement of the said member to move the slide rearwardly in unison therewith and in opposition to the reaction spring, means for automatically releasing the said connecting means upon rearward movement of the grip member to a predetermined rearward position so as to enable the reaction spring to move the slide forwardly independently of the grip member, a trigger, means enabling the trigger to actuate the firing mechanism which means is operable when the grip member is in its said rearward position, means for locking the firing mechanism to cause it to be inoperative when the grip member is in a safety position slightly forward from its said rearward position, and a manually engageable latch for holding the grip member in its said safety position.

62. An automatic pistol as set forth in claim 61, wherein means is provided for disengaging the latch as the result of movement of the grip member from its said safety position to its said rearward position.

References Cited in the file of this patent
UNITED STATES PATENTS

| | | |
|---|---|---|
| 580,926 | Browning | Apr. 20, 1897 |
| 747,585 | Browning | Dec. 22, 1903 |
| 803,948 | Whiting | Nov. 7, 1905 |
| 813,801 | Johnson | Feb. 27, 1906 |
| 896,496 | Whiting | Aug. 18, 1908 |
| 929,491 | Reifgraber | July 27, 1909 |
| 939,882 | Whiting | Nov. 9, 1909 |
| 978,092 | Wesson | Dec. 6, 1910 |
| 989,432 | Schmeisser | Apr. 11, 1911 |
| 1,143,470 | Whiting | June 15, 1915 |
| 1,320,578 | Savage | Nov. 4, 1919 |
| 1,377,629 | Rosebush | May 10, 1921 |
| 1,427,966 | Nickl | Sept. 5, 1922 |
| 1,431,979 | Pomeroy | Oct. 17, 1922 |
| 1,569,856 | Eriksen | Jan. 19, 1926 |
| 1,835,715 | McCoy | Dec. 8, 1931 |
| 2,489,816 | Reilly | Nov. 29, 1949 |
| 2,655,839 | Ruger | Oct. 20, 1953 |
| 2,664,786 | Guisasola | Jan. 5, 1954 |
| 2,776,602 | Sturtevant | Jan. 8, 1957 |

FOREIGN PATENTS

| | | |
|---|---|---|
| 201,958 | Great Britain | Aug. 10, 1923 |
| 603,750 | France | Jan. 12, 1926 |

(Corresponding to U.S. Patent 1,569,856, Jan. 19, 1926)

| | | |
|---|---|---|
| 270,873 | Switzerland | Dec. 16, 1950 |